US012577157B2

(12) United States Patent
Mosher

(10) Patent No.: US 12,577,157 B2
(45) Date of Patent: Mar. 17, 2026

(54) PROCESSING PETROLEUM-DERIVED MATERIALS

(71) Applicant: PLASTONIX INC., Belleville (CA)

(72) Inventor: Vincent Karl Ray Mosher, Campbellford (CA)

(73) Assignee: PLASTONIX INC., Belleville (CA)

( * ) Notice: Subject to any disclaimer, the term of this patent is extended or adjusted under 35 U.S.C. 154(b) by 634 days.

(21) Appl. No.: 17/920,622

(22) PCT Filed: Dec. 2, 2020

(86) PCT No.: PCT/CA2020/051649
§ 371 (c)(1),
(2) Date: Oct. 21, 2022

(87) PCT Pub. No.: WO2021/212206
PCT Pub. Date: Oct. 28, 2021

(65) Prior Publication Data
US 2023/0150873 A1 May 18, 2023

Related U.S. Application Data

(60) Provisional application No. 63/013,764, filed on Apr. 22, 2020.

(51) Int. Cl.
| | |
|---|---|
| *C04B 18/20* | (2006.01) |
| *B29B 17/00* | (2006.01) |
| *B29B 17/04* | (2006.01) |
| *C04B 18/02* | (2006.01) |
| *C04B 26/26* | (2006.01) |
| *C08J 11/06* | (2006.01) |

(52) U.S. Cl.
CPC ........ *C04B 18/022* (2013.01); *B29B 17/0036* (2013.01); *B29B 17/0404* (2013.01); *C04B 18/20* (2013.01); *C04B 26/26* (2013.01); *C08J 11/06* (2013.01); *C08J 2323/06* (2013.01);

*C08J 2323/12* (2013.01); *C08J 2325/06* (2013.01); *C08J 2327/06* (2013.01); *C08J 2355/02* (2013.01); *C08J 2367/02* (2013.01)

(58) Field of Classification Search
USPC .......................................................... 521/46
See application file for complete search history.

(56) References Cited

U.S. PATENT DOCUMENTS

| | | | | |
|---|---|---|---|---|
| 5,226,926 A | * | 7/1993 | Matsuzaki | ............... C08J 11/06 44/550 |
| 6,274,637 B1 | * | 8/2001 | Schallenberg | ...... B29B 17/0026 521/46 |

FOREIGN PATENT DOCUMENTS

| | | |
|---|---|---|
| CN | 206927865 U | 1/2018 |
| WO | WO 2016099320 | 6/2016 |
| WO | WO 2018038669 | 3/2018 |

OTHER PUBLICATIONS

Mohamadshahi et al., "Experimental Evaluation of the Inhibitors Performance on the Kinetics of Asphaltene Flocculation", Journal of Dispersion Science and Technology, 34(4):590-595 (2013).

* cited by examiner

*Primary Examiner* — Terressa Boykin
(74) *Attorney, Agent, or Firm* — Leason Ellis, LLP

(57) ABSTRACT

A method of contacting petroleum-derived plastic materials with a lipid composition comprising fatty acid moieties, and an optional filler, to produce an agglomerate or a composite of the agglomerate, as well as an apparatus for carrying out the method and extruding the agglomerate or composite with a specific form or shape.

21 Claims, 15 Drawing Sheets

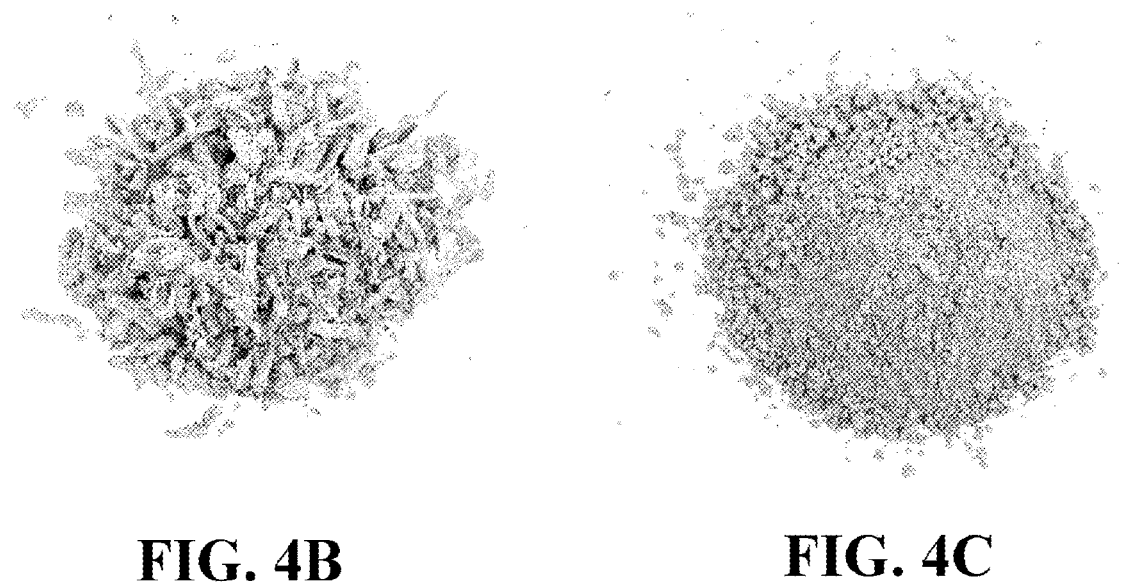
FIG. 4B                    FIG. 4C
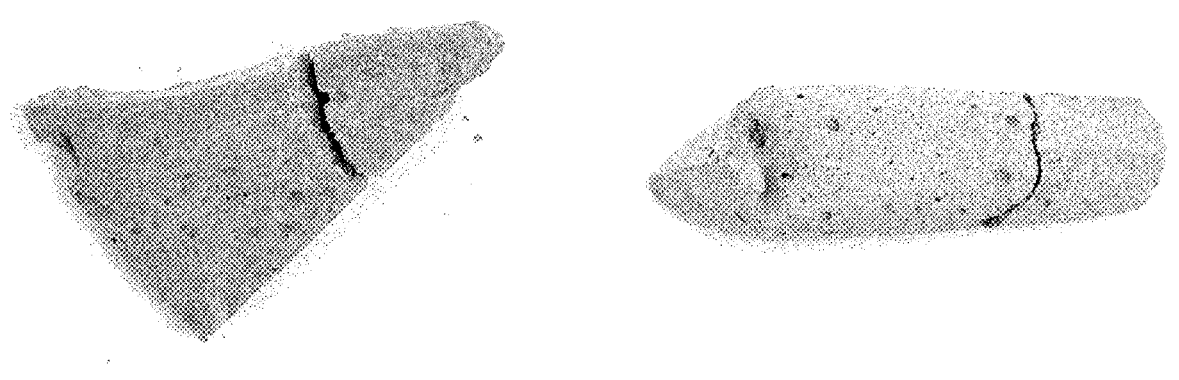
FIG. 4D                    FIG. 4E

PROCESSING PETROLEUM-DERIVED MATERIALS

CROSS-REFERENCE TO RELATED APPLICATIONS

This application is a United States National Phase Application filed under 35 U.S.C. § 371 from International Patent Application No. PCT/CA2020/051649, filed on Dec. 2, 2020, which claims the benefit of priority from U.S. Provisional Application No. 63/013,764, filed on Apr. 22, 2020, the contents, and disclosures of each of these applications are incorporated herein by reference in their entireties.

FIELD

The present application relates generally to methods, systems and apparatuses for processing petroleum-derived materials and products produced therefrom.

BACKGROUND

From 1950 to 2015, the world produced 7.8 billion tonnes of plastic. In 2015, plastics production was 407 million tonnes. Packaging was the dominant use of plastics, making up 42 percent of plastics production. Around three-quarters (302 million tonnes) of plastics produced in 2015 ended up as waste.

Thus, processing petroleum-derived materials and plastic in particular has become indispensable. In 2015, an estimated 55 percent of global plastic waste was discarded, 25 percent was incinerated, and 20 percent recycled. Across many low-to-middle-income income countries, inadequately disposed waste can be high; across many countries in South Asia and Sub-Saharan Africa, between 80 to 90 percent of plastic waste is inadequately disposed of, and therefore at risk of polluting rivers and oceans. Even in high-income countries, the recycling rate for plastic is lower than that for metal, paper, and glass. This reflects the relative difficulty of collecting, sorting, and processing plastics, due to their low density, high likelihood of contamination, and wide-ranging polymer types.

Many conventional techniques for producing economically attractive products from recycled plastics require mono-fractional compositions of waste polymers. The final properties of the recycled materials largely depend on the purity of the plastic residue. In recent years, great effort has been expended in the development of automated identification and sorting methods for postconsumer plastics in the waste streams that are reaching recycling processes. Contamination of the waste material may require washing or other cleaning/separation steps.

There exists a need for the development of improved and/or alternative methods and compositions for processing petroleum-derived materials.

SUMMARY

In one aspect, there is provided a method, comprising contacting a plurality of petroleum-derived materials with a lipid composition comprising fatty acid moieties to produce an agglomerate, wherein from about 9 wt % to about 40 wt % of the fatty acid moieties are saturated, and wherein at least about 0.5 wt % of the fatty acid moieties are mono-unsaturated.

In an embodiment of the method as described herein, the plurality of petroleum-derived materials comprise plastic or a mixture of plastic.

In an embodiment of the method as described herein, the plurality of petroleum-derived materials comprise plastic packaging.

In an embodiment of the method as described herein, the plurality of petroleum-derived materials comprise plastic in the form of a woven or nonwoven fabric, such as protective apparel (e.g., medical or surgical gown, mask, cover, or cap), bed linen, drape, wound dressing, hygiene product (e.g., wipe), liner, or upholstery.

In another aspect, there is provided a method, comprising: (a) contacting a plurality of petroleum-derived materials that comprise plastic in the form of a seal, wire or cable jacket, floor covering, filter, vehicle part, or any combination thereof with a lipid composition comprising fatty acid moieties, wherein from about 9 wt % to about 40 wt % of the fatty acid moieties are saturated, and wherein at least about 0.5 wt % of the fatty acid moieties are monounsaturated; and (b) combining the mixture resulting from step (a) with a composition comprising plastic packaging to produce an agglomerate.

In an embodiment of the method as described herein, the plurality of petroleum-derived materials comprise plastic in the form of a seal, wire or cable jacket, floor covering, filter, vehicle part, or any combination thereof.

In an embodiment of the method as described herein, the method is for recycling the plurality of petroleum-derived materials.

In an embodiment of the method as described herein, the plastic comprises polyethylene, polypropylene, polystyrene, polyethylene terephthalate, or any combination thereof.

In an embodiment of the method as described herein, the lipid composition is provided at a temperature from about 55° C. to about 160° C., from about 65° C. to about 160° C., from about 90° C. to about 160° C., from about 120° C. to about 160° C., from about 125° C. to about 155° C., from about 130° C. to about 150° C., from about 135° C. to about 150° C., from about 135° C. to about 145° C., or from about 140° C. to about 150° C.

In an embodiment of the method as described herein, the fatty acid moieties comprise free fatty acids, fatty acid esters, fatty alcohols, or any combination thereof.

In an embodiment of the method as described herein, the lipid composition comprises an edible oil.

In an embodiment of the method as described herein, the edible oil is corn oil, olive oil, peanut oil, or any combination thereof.

In an embodiment of the method as described herein, from about 10 wt % to about 20 wt % of the fatty acid moieties are saturated, from about 23 wt % to about 33 wt % of the fatty acid moieties are monounsaturated, and from about 52 wt % to about 62 wt % of the fatty acid moieties are polyunsaturated.

In an embodiment of the method as described herein, the method does not comprise sorting the petroleum-derived materials, cleaning the petroleum-derived materials, or both.

In an embodiment of the method as described herein, the method further comprises combining the agglomerate with a starch such as cornstarch, and comminuting the resulting combination to produce a powdered material.

In an embodiment of the method as described herein, the method further comprises combining the agglomerate with a filler and optionally a cement to produce a composite.

In an embodiment of the method as described herein, the method further comprises combining the powdered material with a cement, such as a hydraulic cement; and/or a filler, such as a particulate solid (such as sand, glass, or wood residues such as chips, shavings, or sawdust); and/or a fibrous material (such as a textile fibre such as hemp, cotton, linen, or wool, or a paper such as non-recyclable paper); to produce a composite.

In an embodiment of the method as described herein, the method further comprises combining the agglomerate and a bitumen to produce a paving material.

In another aspect, there is provided a system, comprising a vessel configured for contacting a plurality of petroleum-derived materials with a lipid composition comprising fatty acid moieties to produce an agglomerate, wherein from about 9 wt % to about 40 wt % of the fatty acid moieties are saturated, and wherein at least about 0.5 wt % of the fatty acid moieties are monounsaturated; and a first outlet configured for discharging at least a portion of the agglomerate from the vessel.

In another aspect, there is provided an apparatus for producing an extrudate from petroleum-derived materials, comprising:

(a) a pre-extrusion mixer for contacting a plurality of petroleum-derived materials with a lipid composition comprising fatty acid moieties and a filler to produce a composite, having one or more inlets for receiving the petroleum-derived materials, the lipid composition and the filler, and an outlet for discharging the composite; and (b) an extruder in fluid communication with the outlet of the pre-extrusion mixer.

Other aspects, features, and embodiments of the present disclosure will become apparent to those of ordinary skill in the art upon review of the following description of specific embodiments in conjunction with the accompanying figures.

BRIEF DESCRIPTION OF THE DRAWINGS

FIG. 4B: Product depicted in FIG. 4A coarsely shredded. FIG. 4C: Powdered material produced from product in FIG. 4B, additional cornstarch, and Portland cement. FIG. 4D: Composite produced by curing the powdered material depicted in FIG. 4C with water. FIG. 4E: Composite produced by mixing the powdered material depicted in FIG. 4C with sand and curing with water.

DETAILED DESCRIPTION

Figure 1A:
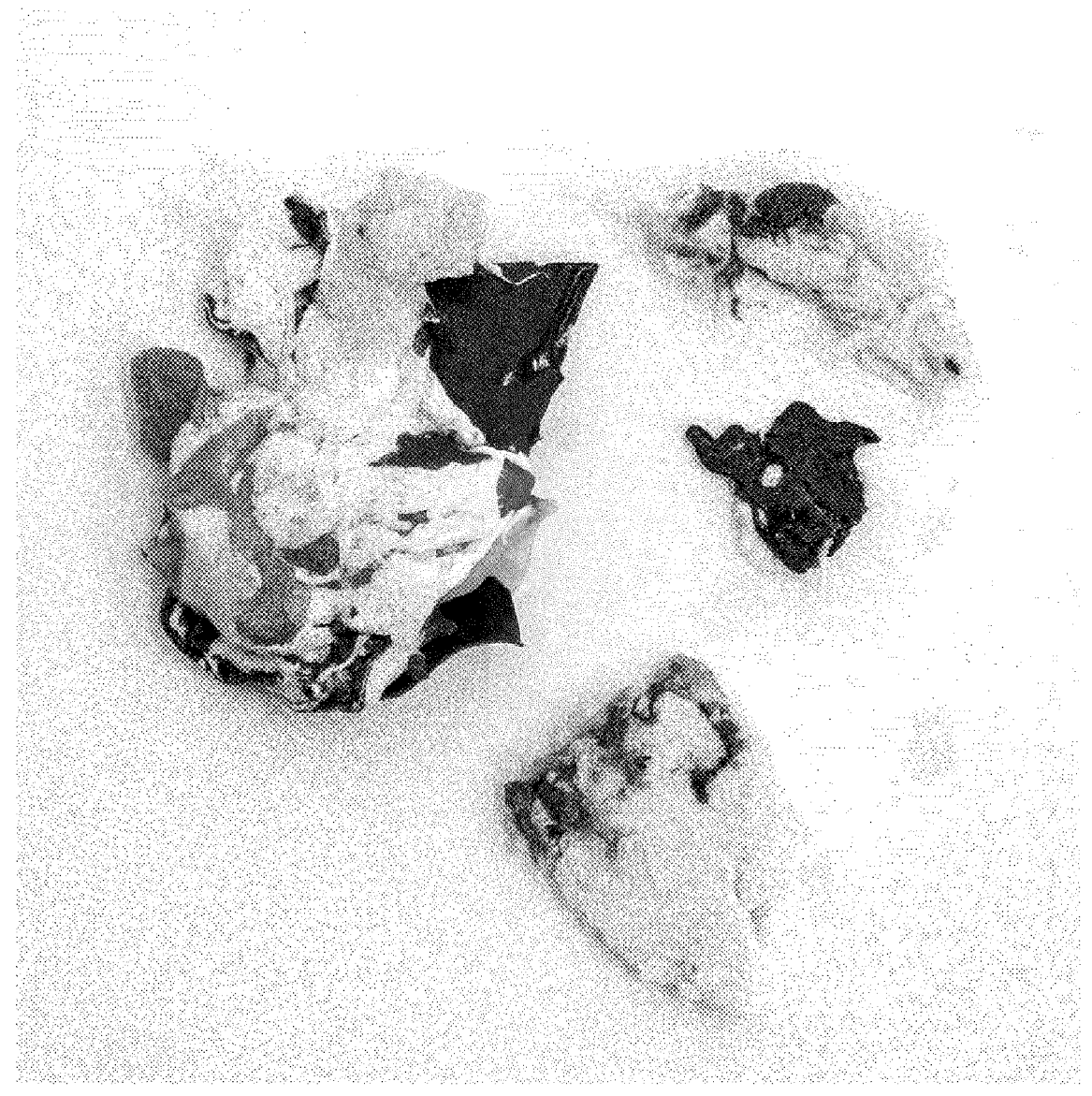
FIGS. 1A-1C: Agglomerates produced by mixing shredded plastic film and thin molded plastics in the following vegetable oils at 66° C.: corn oil (FIG. 1A), olive oil (FIG. 1B), and canola oil (FIG. 1C).

It has been surprisingly discovered by the present inventor that by contacting petroleum-derived materials with a lipid composition comprising fatty acid moieties wherein from about 9 wt % to about 40 wt % of the fatty acid moieties are saturated, and wherein at least about 0.5 wt % of the fatty acid moieties are monounsaturated, the lipid composition is partly or wholly incorporated into at least a portion of the petroleum-derived materials. In some embodiments, lipid compositions provided herein possess binding properties, which allow petroleum-derived materials to adhere to each other. In some embodiments, one or more physical properties of petroleum-derived materials, after incorporating liquid compositions provided herein, are altered. Examples of physical properties that may be altered include, but are not limited to, surface area, material strength (e.g., yield strength, compressive strength, tensile strength, fatigue strength, impact strength, etc.), stiffness, hardness, density, and thermal conductivity.

Without being limited by theory, it is believed that a lipid composition provided herein may be incorporated into petroleum-derived materials by adsorption, absorption and/or chemical reaction. Without being limited by theory, it is further believed that saturated fatty acid moieties of a lipid composition provided herein are capable of facilitating absorption of the lipid composition into petroleum-derived materials, while monounsaturated fatty acid moieties are capable of reacting with petroleum-derived materials.

An embodiment of the present disclosure thus provides a method for processing petroleum-derived materials, comprising contacting a plurality of petroleum-derived materials with a lipid composition comprising fatty acid moieties to produce an agglomerate, wherein from about 9 wt % to about 40 wt % of the fatty acid moieties are saturated, and wherein at least about 0.5 wt % of the fatty acid moieties are monounsaturated.

Moreover, it has been surprisingly discovered by the present inventor that for petroleum-derived materials that are not plastic packaging (such as plastic in the form of a seal, wire or cable jacket, floor covering, filter, vehicle part, or any combination thereof), addition of plastic packaging in a process of contacting the petroleum-derived materials with a lipid composition provided herein improves incorporation of the lipid composition into at least a portion of the petroleum-derived materials and/or adhesion of the petroleum-derived materials to each other.

Another embodiment of the present disclosure thus provides a method, comprising:

(a) contacting a plurality of petroleum-derived materials that comprise plastic in the form of a seal, wire or cable jacket, floor covering, filter, vehicle part, or any combination thereof with a first lipid composition comprising fatty acid moieties, wherein from about 9 wt % to about 40 wt % of the fatty acid moieties are saturated, and wherein at least about 0.5 wt % of the fatty acid moieties are monounsaturated; and (b) combining the mixture resulting from step (a) with a composition comprising plastic packaging to produce an agglomerate.

In some embodiments, step (b) of the method further comprises combining a second lipid composition with the mixture resulting from step (a) and the plastic packaging, wherein the second lipid composition comprises fatty acid moieties, wherein from about 9 wt % to about 40 wt % of the fatty acid moieties are saturated, and wherein at least about 0.5 wt % of the fatty acid moieties are monounsaturated, wherein the second lipid composition is the same as or different from the first composition.

In some embodiments, methods provided herein are for recycling petroleum-derived materials.

Petroleum-Derived Materials

As used herein, a "petroleum-derived material" refers to a material derived from petroleum as it is processed in oil refineries. Petroleum-derived materials that may be processed by methods described herein comprise plastic, wax, resin, or a combination thereof. Petroleum-derived materials include materials naturally occurring in petroleum such as paraffin wax, and materials synthetically derived from petrochemicals.

In some embodiments, the petroleum-derived materials comprise plastic, which may be extruded, molded, cast, foamed, or any combination thereof.

In some embodiments, the plastic is plastic packaging. In some embodiments, the plastic packaging comprises a plastic film, a plastic container, or both.

In some embodiments, plastic may be extruded into a sheet or film. Sheets and films are continuous membranes that can separate one area from another. These membranes can vary in thickness, ranging from less than that for rigid containers to thin coatings. Typically, sheets refer to plastic boards with thicknesses higher than 1 mm. Plastic structures with thicknesses less than 1 mm, such as less than 10 mils (250 μm) or less than 1 mil (25 μm), are referred to as plastic film. Products made from plastic film include, but are not limited to, bags, liners, wraps, tapes, labels.

In some embodiments, the plastic is in the form of a woven or nonwoven fabric, such as protective apparel (e.g., medical or surgical gown, mask, cover, or cap), bed linen, drape, wound dressing, hygiene product (e.g., wipe), liner, or upholstery.

Plastic may be molded, e.g., by compression molding, injection molding, reaction injection molding, or blow molding, into various products, such as trays, lids, bottles, bottle caps or other containers, or utensils, straws, or stirrers. Plastic may be provided in the form of a foam (e.g., for insulation or soundproofing), seal, wire or cable jacket (e.g., a plenum cable jacket; wire/cable jackets are also known as wire/cable sheathing or sleeving), floor covering, or filter. Plastic may be provided in the form of a vehicle part, e.g., a lamp, grille, dashboard, bumper, fluid tank, handle, button, casing, container, clamp, or socket, which may comprise more than one type of plastic.

In some embodiments, the plastic comprises polyethylene (PE, such as high-density PE (HDPE), low-density PE (LDPE), or cross-linked polyethylene (PEX)), polypropylene (PP), polystyrene (PS), polyvinyl chloride (PVC, such as crosslinked polyvinyl chloride), polyamide (such as a nylon or a cross-linked polyamide), polyester (such as polybutylene terephthalate (PBT) or polyethylene terephthalate (PET)), acrylonitrile butadiene styrene (ABS), polycarbonate (PC), polyoxymethylene (POM), or any combination or blend thereof. In some embodiments, the plastic is reinforced with a filler, e.g., glass fiber, carbon fiber, or glass beads.

In some embodiments, the plastic is combined with an additive, such as a flame retardant.

In some embodiments, the plastic comprises an elastomer, such as a natural rubber, thermoplastic rubber, neoprene, styrene-butadiene rubber, polybutadiene, nitrile rubber, butyl rubber, or ethylene propylene diene monomer (EPDM) rubber.

In some embodiments, the plastic is sorted. In some embodiments, the plastic is unsorted. In some embodiments, the plastic is cleaned. In some embodiments, the plastic is not cleaned. In some embodiments, the plastic is waste plastic. In some embodiments, the plastic is a mix of virgin plastic and waste plastic. In some embodiments, the plastic comprises recyclable plastic, non-recyclable plastic, or a combination thereof. In some embodiments, the plastic is classified according to the ASTM International Resin Identification Coding (RIC) System (ASTM D7611) as type 1, type 2, type 3, type 4, type 5, type 6, type 7, or a combination thereof. In some embodiments, the plastic is post-consumer waste plastic, e.g., household waste, commercial waste, or healthcare textile waste. In some embodiments, the plastic is pre-consumer waste plastic, e.g., post-commercial plastic packaging. In some embodiments, the plastic is post-industrial waste plastic, e.g., vehicle plastic scrap. In some embodiments, the plastic is end-of-life waste plastic, such as end-of-life vehicle, electronic (i.e., e-waste), or appliance waste.

In some embodiments, the petroleum-derived materials are provided in combination with paper, such as wax paper or photographic paper.

Methods

In some embodiments, methods provided herein are capable of processing more than one type of petroleum-derived materials, for example, at least two, three, four, five, six, seven, eight, nine, or ten types of petroleum-derived materials.

In some embodiments, the contacting comprises spraying (e.g., through a nozzle) the lipid composition on the petroleum-derived materials, soaking (e.g., submerging or coating) the petroleum-derived materials in the lipid composition, and/or mixing (e.g., blending or folding) the lipid composition with the petroleum-derived materials.

In some embodiments, the lipid composition is provided at a temperature lower than the highest softening point of the petroleum-derived materials, as determined by test methods such as the Vicat softening point test (VSP test) or the heat deflection temperature under load test (HDT test). In some embodiments, the lipid composition is provided at a temperature lower than the lowest softening point of the petroleum-derived materials.

In some embodiments, the lipid composition is provided at a temperature lower than the smoke point of the lipid composition.

In some embodiments, the lipid composition is provided at a temperature lower than the highest softening point of the petroleum-derived materials and lower than the smoke point of the lipid composition.

In some embodiments, the lipid composition is provided at a temperature lower than the lowest softening point of the petroleum-derived materials and lower than the smoke point of the lipid composition.

In some embodiments, at least a portion of the plurality of petroleum-derived materials subjected to a method provided herein is not melted. The portion of the plurality of petroleum-derived materials which is not melted may be at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, or at least about 99 wt % of the plurality of petroleum-derived materials.

In some embodiments, the entirety of the plurality of petroleum-derived materials subjected to a method provided herein is not melted.

In some embodiments, the lipid composition provided herein does not produce smoke or fumes.

In some embodiments, at least a portion of the plurality of petroleum-derived materials subjected to a method provided herein does not degrade, e.g., chemically or physically. The portion of the plurality of petroleum-derived materials which is not melted and does not degrade may be at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, or at least about 99 wt % of the plurality of petroleum-derived materials.

In some embodiments, the entirety of the plurality of petroleum-derived materials subjected to a method provided herein does not degrade.

In some embodiments, at least a portion of the plurality of petroleum-derived materials subjected to a method provided herein is not melted and does not degrade, e.g., chemically or physically. The portion of the plurality of petroleum-derived materials which is not melted and does not degrade may be at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, or at least about 99 wt % of the plurality of petroleum-derived materials.

In some embodiments, the entirety of the plurality of petroleum-derived materials subjected to a method provided herein is not melted and does not degrade.

In some embodiments, the lipid composition is provided at a temperature from about 40° C. to about 160° C., from about 40° C. to about 155° C., from about 40° C. to about 150° C., from about 40° C. to about 145° C., from about 40° C. to about 140° C., from about 40° C. to about 135° C., from about 40° C. to about 130° C., from about 40° C. to about 125° C., from about 40° C. to about 120° C., from about 40° C. to about 115° C., from about 40° C. to about 110° C., from about 40° C. to about 105° C., from about 40° C. to about 100° C., from about 40° C. to about 95° C., from about 40° C. to about 90° C., from about 40° C. to about 85° C., from about 40° C. to about 80° C., from about 40° C. to about 75° C., from about 40° C. to about 70° C., from about 40° C. to about 65° C., from about 40° C. to about 60° C., from about 40° C. to about 55° C., from about 40° C. to about 50° C., from about 40° C. to about 45° C., from about 45° C. to about 160° C., from about 45° C. to about 155° C., from about 45° C. to about 150° C., from about 45° C. to about 145° C., from about 45° C. to about 140° C., from about 45° C. to about 135° C., from about 45° C. to about 130° C., from about 45° C. to about 125° C., from about 45° C. to about 120° C., from about 45° C. to about 115° C., from about 45° C. to about 110° C., from about 45° C. to about 105° C., from about 45° C. to about 100° C., from about 45° C. to about 95° C., from about 45° C. to about 90° C., from about 45° C. to about 85° C., from about 45° C. to about 80° C., from about 45° C. to about 75° C., from about 45° C. to about 70° C., from about 45° C. to about 65° C., from about 45° C. to about 60° C., from about 45° C. to about 55° C., from about 45° C. to about 50° C., from about 50° C. to about 160° C., from about 50° C. to about 155° C., from about 50° C. to about 150° C., from about 50° C. to about 145° C., from about 50° C. to about 140° C., from about 50° C. to about 135° C., from about 50° C. to about 130° C., from about 50° C. to about 125° C., from about 50° C. to about 120° C., from about 50° C. to about 115° C., from about 50° C. to about 110° C., from about 50° C. to about 105° C., from about 50° C. to about 100° C., from about 50° C. to about 95° C., from about 50° C. to about 90° C., from about 50° C. to about 85° C., from about 50° C. to about 80° C., from about 50° C. to about 75° C., from about 50° C. to about 70° C., from about 50° C. to about 65° C., from about 50° C. to about 60° C., from about 50° C. to about 55° C., from about 55° C. to about 160° C., from about 55° C. to about 155° C., from about 55° C. to about 150° C., from about 55° C. to about 145° C., from about 55° C. to about 140° C., from about 55° C. to about 135° C., from about 55° C. to about 130° C., from about 55° C. to about 125° C., from about 55° C. to about 120° C., from about 55° C. to about 115° C., from about 55° C. to about 110° C., from about 55° C. to about 105° C., from about 55° C. to about 100° C., from about 55° C. to about 95° C., from about 55° C. to about 90° C., from about 55° C. to about 85° C., from about 55° C. to about 80° C., from about 55° C. to about 75° C., from about 55° C. to about 70° C., from about 55° C. to about 65° C., from about 55° C. to about 60° C., from about 60° C. to about 160° C., from about 60° C. to about 155° C., from about 60° C. to about 150° C., from about 60° C. to about 145° C., from about 60° C. to about 140° C., from about 60° C. to about 135° C., from about 60° C. to about 130° C., from about 60° C. to about 125° C., from about 60° C. to about 120° C., from about 60° C. to about 115° C., from about 60° C. to about 110° C., from about 60° C. to about 105° C., from about 60° C. to about 100° C., from about 60° C. to about 95° C., from about 60° C. to about 90° C., from about 60° C. to about 85° C., from about 60° C. to about 80° C., from about 60° C. to about 75° C., from about 60° C. to about 70° C., from about 60° C. to about 65° C., from about 65° C. to about 160° C., from about 65° C. to about 155° C., from about 65° C. to about 150° C., from about 65° C. to about 145° C., from about 65° C. to about 140° C., from about 65° C. to about 135° C., from about 65° C. to about 130° C., from about 65° C. to about 125° C., from about 65° C. to about 120° C., from about 65° C. to about 115° C., from about 65° C. to about 110° C., from about 65° C. to about 105° C., from about 65° C. to about 100° C., from about 65° C. to about 95° C., from about 65° C. to about 90° C., from about 65° C. to about 85° C., from about 65° C. to about 80° C., from about 65° C. to about 75° C., from about 65° C. to about 70° C., from about 70° C. to about 160° C., from about 70° C. to about 155° C., from about 70° C. to about 150° C., from about 70° C. to about 145° C., from about 70° C. to about 140° C., from about 70° C. to about 135° C., from about 70° C. to about 130° C., from about 70° C. to about 125° C., from about 70° C. to about 120° C., from about 70° C. to about 115° C., from about 70° C. to about 110° C., from about 70° C. to about 105° C., from about 70° C. to about 100° C., from about 70° C. to about 95° C., from about 70° C. to about 90° C., from about 70° C. to about 85° C., from about 70° C. to about 80° C., from about 70° C. to about 75° C., from about 75° C. to about 160° C., from about 75° C. to about 155° C., from about 75° C. to about 150° C., from about 75° C. to about 145° C., from about 75° C. to about 140° C., from about 75° C. to about 135° C., from about 75° C. to about 130° C., from about 75° C. to about 125° C., from about 75° C. to about 120° C., from about 75° C. to about 115° C., from about 75° C. to about 110° C., from about 75° C. to about 105° C., from about 75° C. to about 100° C., from about 75° C. to about 95° C., from about 75° C. to about 90° C., from about 75° C. to about 85° C., from about 75° C. to about 80° C., from about 80° C. to about 160° C., from about 80° C. to about 155° C., from about 80° C. to about 150° C., from about 80° C. to about 145° C., from about 80° C. to about 140° C., from about 80° C. to about 135° C., from about 80° C. to about 130° C., from about 80° C. to about 125° C., from about 80° C. to about 120° C., from about 80° C. to about 115° C., from about 80° C. to about 110° C., from about 80° C. to about 105° C., from about 80° C. to about 100° C., from about 80° C. to about 95° C., from about 80° C. to about 90° C., from about 80° C. to about 85° C., from about 85° C. to about 160° C., from about 85° C. to about 155° C., from about 85° C. to about 150° C., from about 85° C. to about 145° C., from about 85° C. to about 140° C., from about 85° C. to about 135° C., from about 85° C. to about 130° C., from about 85° C. to about 125° C., from about 85° C. to about 120° C., from about 85° C. to about 115° C., from about 85° C. to about 110° C., from about 85° C. to about 105° C., from about 85° C. to about 100° C., from about 85° C. to about 95° C., from about 85° C. to about 90° C., from about 90° C. to about 160° C., from about 90° C. to about 155° C., from about 90° C. to about 150° C., from about 90° C. to about 145° C., from about 90° C. to about 140° C., from about 90° C. to about 135° C., from about 90° C. to about 130° C., from about 90° C. to about 125° C., from about 90° C. to about 120° C., from about 90° C. to about 115° C., from about 90° C. to about 110° C., from about 90° C. to about 105° C., from about 90° C. to about 100° C., from about 90° C. to about 95° C., from about 95° C. to about 160° C., from about 95° C. to about 155° C., from about 95° C. to about 150° C., from about 95° C. to about 145° C., from about 95° C. to about 140° C., from about 95° C. to about 135° C., from about 95° C. to about 130° C., from about 95° C. to about 125° C., from about 95° C. to about 120° C., from about 95° C. to about 115° C., from about 95° C. to about 110° C., from about 95° C. to about 105° C., from about 95° C. to about 100° C., from about 100° C. to about 160° C., from about 100° C. to about 155° C., from about 100° C. to about 150° C., from about 100° C. to about 145° C., from about 100° C. to about 140° C., from about 100° C. to about 135° C., from about 100° C. to about 130° C., from about 100° C. to about 125° C., from about 100° C. to about 120° C., from about 100° C. to about 115° C., from about 100° C. to about 110° C., from about 100° C. to about 105° C., from about 105° C. to about 160° C., from about 105° C. to about 155° C., from about 105° C. to about 150° C., from about 105° C. to about 145° C., from about 105° C. to about 140° C., from about 105° C. to about 135° C., from about 105° C. to about 130° C., from about 105° C. to about 125° C., from about 105° C. to about 120° C., from about 105° C. to about 115° C., from about 105° C. to about 110° C., from about 110° C. to about 160° C., from about 110° C. to about 155° C., from about 110° C. to about 150° C., from about 110° C. to about 145° C., from about 110° C. to about 140° C., from about 110° C. to about 135° C., from about 110° C. to about 130° C., from about 110° C. to about 125° C., from about 110° C. to about 120° C., from about 110° C. to about 115° C., from about 115° C. to about 160° C., from about 115° C. to about 155° C., from about 115° C. to about 150° C., from about 115° C. to about 145° C., from about 115° C. to about 140° C., from about 115° C. to about 135° C., from about 115° C. to about 130° C., from about 115° C. to about 125° C., from about 115° C. to about 120° C., from about 120° C. to about 160° C., from about 120° C. to about 155° C., from about 120° C. to about 150° C., from about 120° C. to about 145° C., from about 120° C. to about 140° C., from about 120° C. to about 135° C., from about 120° C. to about 130° C., from about 120° C. to about 125° C., from about 125° C. to about 160° C., from about 125° C. to about 155° C., from about 125° C. to about 150° C., from about 125° C. to about 145° C., from about 125° C. to about 140° C., from about 125° C. to about 135° C., from about 125° C. to about 130° C., from about 130° C. to about 160° C., from about 130° C. to about 155° C., from about 130° C. to about 150° C., from about 130° C. to about 145° C., from about 130° C. to about 140° C., from about 130° C. to about 135° C., from about 135° C. to about 160° C., from about 135° C. to about 155° C., from about 135° C. to about 150° C., from about 135° C. to about 145° C., from about 135° C. to about 140° C., from about 140° C. to about 160° C., from about 140° C. to about 155° C., from about 140° C. to about 150° C., from about 140° C. to about 145° C., from about 145° C. to about 160° C., from about 145° C. to about 155° C., from about 145° C. to about 150° C., from about 150° C. to about 160° C., from about 150° C. to about 155° C., or from about 155° C. to about 160° C.

In some embodiments, the lipid composition is provided at a temperature from about 55° C. to about 160° C., from about 65° C. to about 160° C., from about 90° C. to about 160° C., from about 120° C. to about 160° C., from about 125° C. to about 155° C., from about 130° C. to about 150° C., from about 135° C. to about 150° C., from about 135° C. to about 145° C., or from about 140° C. to about 150° C. In some embodiments, the lipid composition is provided at a temperature from about 135° C. to about 145° C., or from about 140° C. to about 150° C.

In some embodiments, the lipid composition is provided at a temperature of about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 75° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., about 110° C., about 111° C., about 112° C., about 113° C., about 114° C., about 115° C., about 116° C., about 117° C., about 118° C., about 119° C., about 110° C., about 111° C., about 112° C., about 113° C., about 114° C., about 115° C., about 116° C., about 117° C., about 118° C., about 119° C., about 120° C., about 121° C., about 122° C., about 123° C., about 124° C., about 125° C., about 126° C., about 127° C., about 128° C., about 129° C., about 130° C., about 131° C., about 132° C., about 133° C., about 134° C., about 135° C., about 136° C., about 137° C., about 138° C., about 139° C., about 140° C., about 141° C., about 142° C., about 143° C., about 144° C., about 145° C., about 146° C., about 147° C., about 148° C., about 149° C., about 150° C., about 151° C., about 152° C., about 153° C., about 154° C., about 155° C., about 156° C., about 157° C., about 158° C., about 159° C., or about 160° C.

In some embodiments, the petroleum-derived materials are contacted with the lipid composition for about 1 s to about 60 min, for about 1 s to about 10 min, for about 1 s to about 1 min, for about 1 s to about 10 s, for about 10 s to about 60 min, for about 10 s to about 10 min, for about 10 s to about 1 min, for about 1 min to about 60 min, for about 1 min to about 10 min, or for about 10 min to about 60 min. In some embodiments, the petroleum-derived materials are contacted with the lipid composition for about 1 s, about 2 s, about 3 s, about 4 s, about 5 s, about 6 s, about 7 s, about 8 s, about 9 s, about 10 s, about 15 s, about 30 s, about 45 s, about 1 min, about 2 min, about 3 min, about 4 min, about 5 min, about 6 min, about 7 min, about 8 min, about 9 min, about 10 min, about 15 min, about 20 min, about 25 min, about 30 min, about 35 min, about 40 min, about 45 min, about 50 min, about 55 min, or about 60 min. In some embodiments, the petroleum-derived materials are contacted with the lipid composition for no longer than 1 s, no longer than 2 s, no longer than 3 s, no longer than 4 s, no longer than 5 s, no longer than 6 s, no longer than 7 s, no longer than 8 s, no longer than 9 s, no longer than 10 s, no longer than 15 s, no longer than 30 s, no longer than 45 s, no longer than 1 min, no longer than 2 min, no longer than 3 min, no longer than 4 min, no longer than 5 min, no longer than 6 min, no longer than 7 min, no longer than 8 min, no longer than 9 min, no longer than 10 min, no longer than 15 min, no longer than 20 min, no longer than 25 min, no longer than 30 min, no longer than 35 min, no longer than 40 min, no longer than 45 min, no longer than 50 min, no longer than 55 min, or no longer than 60 min. At a given temperature, a shorter contact time may be preferred for incorporation of the lipid composition into more flexible and/or thinner plastics such as plastic packaging, while a longer contact time may be preferred for more rigid and/or thicker and/or crosslinked plastics such as crosslinked PVC.

In some embodiments, the petroleum-derived materials subjected to a method provided herein become sterilized.

In some embodiments, the petroleum-derived materials and the lipid composition are contacted in a weight ratio of from about 100:1 to about 4:1, such as about 100:1, about 50:1, about 40:1, about 35:1, about 32:1, about 30:1, about 25:1, about 20:1, about 15:1, about 10:1, about 9:1, about 8:1, about 7:1, about 6:1, about 5:1, or about 4:1. In some embodiments, the petroleum-derived materials and the lipid composition are contacted in a weight ratio of from about 40:1 to about 20:1, or from about 35:1 to about 30:1.

Lipid Compositions

As used herein, a "lipid composition" refers to a composition that includes a mixture of lipids. As used herein, a "lipid" is a substance of biological origin that is soluble in nonpolar solvents. Fatty acid moieties may be present in lipids, e.g., in the form of free fatty acids, fatty acid esters, fatty alcohols, or any combination thereof. As used herein, a "fatty acid" refers to a carboxylic acid with an aliphatic chain of at least six carbon atoms. Medium-chain fatty acids have an aliphatic chain of six to twelve carbon atoms; long-chain fatty acids have an aliphatic chain of 13 to 21 carbon atoms; and very long-chain fatty acids have an aliphatic chain of 22 or more carbon atoms. Fatty acid moieties may be either saturated or unsaturated (i.e., mono-unsaturated or polyunsaturated). Saturated free fatty acids include, but are not limited to, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, and lignoceric acid. Monounsaturated free fatty acids include, but are not limited to, myristoleic acid, palmitoleic acid, heptadecenoic acid, vaccenic acid, paullinic acid, oleic acid, eicosenoic acid, erucic acid, nervonic acid, and all their respective regioisomers and cis-trans isomers, such as elaidic acid. Polyunsaturated free fatty acids include, but are not limited to, linoleic acid, linolenic acid, eicosadienoic acid, dihomolinolenic acid, arachidonic acid, docosadienoic acid, adrenic acid, and all their respective regioisomers and cis-trans isomers, such as conjugated linoleic acid. Fatty acid esters include, but are not limited to, esters of any of the previously mentioned fatty acids, such as palmitate, stearate, oleate, linoleate or linolenate. Fatty alcohols include, but are not limited to, alcohols obtained by reduction of any of the previously mentioned fatty acids.

In some embodiments, the fatty acid ester is a triglyceride, such as a medium-chain triglyceride or a long-chain triglyceride. In some embodiments, the triglyceride is an edible oil, such as an animal oil, plant oil, or any combination thereof. Plant oils include, but are not limited to, adjouaba oil, African bean oil, amaranth oil, argan oil, artichoke oil, avocado oil, black cumin oil, borage oil, buckwheat oil, cactus pear oil, camelina oil, chia oil, corn oil, cotton seed oil, cranberry seed oil, cumin oil, fenugreek oil, gokhru oil, hemp oil, kenaf oil, linseed oil, lupin oil, macadamia nut oil, melon seed oil, niger seed oil, oat oil, olive oil, onion oil, paprika seed oil, peanut oil, perilla oil, pistachio oil, pumpkin seed oil, purslane oil, quinoa oil, ratanjyot oil, sea buckthorn berry oil, sea buckthorn seed oil, silver maple seed oil, stock oil, sugar maple seed oil, rice bran oil, safflower oil, salicorn oil, sesame oil, soybean oil, sunflower oil, thumba oil, tobacco seed oil, watermelon seed oil, and wheat germ oil. In some embodiments, the plant oil is corn oil. In some embodiments, the plant oil is olive oil. In some embodiments, the plant oil is peanut oil.

In some embodiments, from about 9 wt % to about 40 wt %, about 10 wt % to about 40 wt %, from about 15 wt % to about 40 wt %, from about 20 wt % to about 40 wt %, from about 25 wt % to about 40 wt %, from about 30 wt % to about 40 wt %, from about 35 wt % to about 40 wt %, from about 9 wt % to about 35 wt %, from about 10 wt % to about 35 wt %, from about 15 wt % to about 35 wt %, from about 20 wt % to about 35 wt %, from about 25 wt % to about 35 wt %, from about 30 wt % to about 35 wt %, from about 9 wt % to about 30 wt %, from about 10 wt % to about 30 wt %, from about 15 wt % to about 30 wt %, from about 20 wt % to about 30 wt %, from about 25 wt % to about 30 wt %, from about 9 wt % to about 25 wt %, from about 10 wt % to about 25 wt %, from about 15 wt % to about 25 wt %, from about 20 wt % to about 25 wt %, from about 9 wt % to about 20 wt %, from about 10 wt % to about 20 wt %, from about 15 wt % to about 20 wt %, from about 9 wt % to about 15 wt %, from about 10 wt % to about 15 wt %, or from about 9 wt % to about 10 wt % of the fatty acid moieties are saturated.

In some embodiments, at least about 0.5 wt %, at least about 1 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, 11 wt %, at least about 12 wt %, at least about 13 wt %, at least about 14 wt %, at least about 15 wt %, at least about 16 wt %, at least about 17 wt %, at least about 18 wt %, at least about 19 wt %, at least about 20 wt %, at least about 21 wt %, at least about 22 wt %, at least about 23 wt %, at least about 24 wt %, at least about 25 wt %, at least about 26 wt %, at least about 27 wt %, at least about 28 wt %, at least about 29 wt %, at least about 30 wt %, at least about 31 wt %, at least about 32 wt %, at least about 33 wt %, at least about 34 wt %, at least about 35 wt %, at least about 36 wt %, at least about 37 wt %, at least about 38 wt %, at least about 39 wt %, at least about 40 wt %, at least about 41 wt %, at least about 42 wt %, at least about 43 wt %, at least about 44 wt %, at least about 45 wt %, at least about 46 wt %, at least about 47 wt %, at least about 48 wt %, at least about 49 wt %, at least about 50 wt %, at least about 51 wt %, at least about 52 wt %, at least about 53 wt %, at least about 54 wt %, at least about 55 wt %, at least about 56 wt %, at least about 57 wt %, at least about 58 wt %, at least about 59 wt %, at least about 60 wt %, at least about 61 wt %, at least about 62 wt %, at least about 63 wt %, at least about 64 wt %, at least about 75 wt %, at least about 66 wt %, at least about 67 wt %, at least about 68 wt %, at least about 69 wt %, at least about 70 wt %, at least about 71 wt %, at least about 72 wt %, or at least about 73 wt % of the fatty acid moieties are monounsaturated.

In some embodiments, from about 14 wt % to about 16 wt % of the fatty acid moieties are saturated, from about 27 wt % to about 29 wt % of the fatty acid moieties are monounsaturated, and from about 56 wt % to about 58 wt % of the fatty acid moieties are polyunsaturated.

In some embodiments, from about 13 wt % to about 17 wt % of the fatty acid moieties are saturated, from about 26 wt % to about 30 wt % of the fatty acid moieties are monounsaturated, and from about 55 wt % to about 59 wt % of the fatty acid moieties are polyunsaturated.

In some embodiments, from about 12 wt % to about 18 wt % of the fatty acid moieties are saturated, from about 25 wt % to about 31 wt % of the fatty acid moieties are monounsaturated, and from about 54 wt % to about 60 wt % of the fatty acid moieties are polyunsaturated In some embodiments, about 11 wt % to about 19 wt % of the fatty acid moieties are saturated, from about 24 wt % to about 32 wt % of the fatty acid moieties are monounsaturated, and from about 53 wt % to about 61 wt % of the fatty acid moieties are polyunsaturated.

In some embodiments, from about 10 wt % to about 20 wt % of the fatty acid moieties are saturated, from about 23 wt % to about 33 wt % of the fatty acid moieties are monounsaturated, and from about 52 wt % to about 62 wt % of the fatty acid moieties are polyunsaturated.

In some embodiments, from about 14 wt % to about 16 wt % of the fatty acid moieties are saturated, from about 73 wt % to about 75 wt % of the fatty acid moieties are monounsaturated, and from about 9 wt % to about 11 wt % of the fatty acid moieties are polyunsaturated.

In some embodiments, from about 13 wt % to about 17 wt % of the fatty acid moieties are saturated, from about 72 wt % to about 76 wt % of the fatty acid moieties are monounsaturated, and from about 8 wt % to about 12 wt % of the fatty acid moieties are polyunsaturated.

In some embodiments, from about 12 wt % to about 18 wt % of the fatty acid moieties are saturated, from about 71 wt % to about 77 wt % of the fatty acid moieties are monounsaturated, and from about 7 wt % to about 13 wt % of the fatty acid moieties are polyunsaturated.

In some embodiments, from about 11 wt % to about 19 wt % of the fatty acid moieties are saturated, from about 70 wt % to about 78 wt % of the fatty acid moieties are monounsaturated, and from about 6 wt % to about 14 wt % of the fatty acid moieties are polyunsaturated.

In some embodiments, from about 10 wt % to about 20 wt % of the fatty acid moieties are saturated, from about 69 wt % to about 79 wt % of the fatty acid moieties are monounsaturated, and from about 5 wt % to about 15 wt % of the fatty acid moieties are polyunsaturated.

In some embodiments, from about 17 wt % to about 19 wt % of the fatty acid moieties are saturated, from about 49 wt % to about 51 wt % of the fatty acid moieties are monounsaturated, and from about 30 wt % to about 32 wt % of the fatty acid moieties are polyunsaturated.

In some embodiments, from about 16 wt % to about 20 wt % of the fatty acid moieties are saturated, from about 48 wt % to about 52 wt % of the fatty acid moieties are monounsaturated, and from about 29 wt % to about 33 wt % of the fatty acid moieties are polyunsaturated.

In some embodiments, from about 15 wt % to about 21 wt % of the fatty acid moieties are saturated, from about 47 wt % to about 53 wt % of the fatty acid moieties are monounsaturated, and from about 28 wt % to about 34 wt % of the fatty acid moieties are polyunsaturated.

In some embodiments, from about 14 wt % to about 22 wt % of the fatty acid moieties are saturated, from about 46 wt % to about 54 wt % of the fatty acid moieties are monounsaturated, and from about 27 wt % to about 35 wt % of the fatty acid moieties are polyunsaturated.

In some embodiments, from about 13 wt % to about 23 wt % of the fatty acid moieties are saturated, from about 45 wt % to about 55 wt % of the fatty acid moieties are monounsaturated, and from about 26 wt % to about 36 wt % of the fatty acid moieties are polyunsaturated.

In some embodiments, from about 14 wt % to about 19 wt % of the fatty acid moieties are saturated, from about 28 wt % to about 74 wt % of the fatty acid moieties are monounsaturated, and from about 10 wt % to about 58 wt % of the fatty acid moieties are polyunsaturated.

In some embodiments, from about 9 wt % to about 19 wt % of the fatty acid moieties are saturated, from about 13 wt % to about 74 wt % of the fatty acid moieties are monounsaturated, and from about 10 wt % to about 78 wt % of the fatty acid moieties are polyunsaturated.

In some embodiments, the lipid composition further comprises tocopherols (such as α-, β-, γ-, or δ-tocopherols), phytosterols (such as sitosterol, campesterol, stigmasterol, sitostanol, or campestanol), ferulic acid esters of phytosterols (such as γ-oryzanol), or any combination thereof.

Agglomerates

As used herein, an "agglomerate" refers to a contiguous mass. An agglomerate produced by a method provided herein comprises petroleum-derived materials incorporating the lipid composition used and adhering to each other.

In some embodiments, at least 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, or at least about 99 wt % of the plurality of petroleum-derived materials subject to a method provided herein are produced as one or more agglomerates.

In some embodiments, agglomerates produced by a method provided herein comprise at least about 0.1 wt %, at least about 1 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, 11 wt %, at least about 12 wt %, at least about 13 wt %, at least about 14 wt %, at least about 15 wt %, at least about 16 wt %, at least about 17 wt %, at least about 18 wt %, at least about 19 wt %, or at least about 20 wt % of the lipid composition used. In some embodiments, agglomerates produced by a method provided herein comprise about 0.1 wt %, about 1 wt %, about 2 wt %, about 3 wt %, about 4 wt %, about 5 wt %, about 6 wt %, about 7 wt %, about 8 wt %, about 9 wt %, about 10 wt %, about 15 wt %, or about 20 wt % of the lipid composition. In some embodiments, agglomerates produced by a method provided herein comprise from more than 0 wt % to about 20 wt % of the lipid composition used, such as from about 0.1 wt % to about 20 wt %, from about 1 wt % to about 20 wt %, from about 1 wt % to about 15 wt %, from about 1 wt % to about 10 wt %, from about 1 wt % to about 9 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, from about 3 wt % to about 5 wt %, from about 4 wt % to about 5 wt %, from about 1 wt % to about 4 wt %, from about 2 wt % to about 4 wt %, from about 3 wt % to about 4 wt %, from about 1 wt % to about 3 wt %, from about 2 wt % to about 3 wt %, or from about 1 wt % to about 2 wt % of the lipid composition. In some embodiments, agglomerates produced by a method provided herein comprise from about 3 wt % to about 4 wt % of the lipid composition used.

In some embodiments, agglomerates produced by a method provided herein have a lower viscosity compared to petroleum-derived materials at the temperature at which the agglomerate is produced.

In some embodiments, agglomerates produced by a method provided herein are less stiff compared to petroleum-derived materials at the temperature at which the agglomerate is produced.

In some embodiments, agglomerates produced by a method provided are more capable of adhering to other materials compared to petroleum-derived materials at the temperature at which the agglomerate is produced.

In some embodiments, agglomerates produced by a method provided herein are less thermally conductive compared to petroleum-derived materials at the temperature at which the agglomerate is produced.

In some embodiments, agglomerates produced by a method provided herein have a lower viscosity and/or are less stiff and/or are more capable of adhering to other materials and/or are less thermally conductive compared to petroleum-derived materials at the temperature at which the agglomerate is produced.

In some embodiments, agglomerates produced by a method provided herein are modified relative to the petroleum-derived materials in one or more of the following physical properties: surface area, material strength (e.g., yield strength, compressive strength, tensile strength, fatigue strength, impact strength, etc.), stiffness, hardness, density, and thermal conductivity. In some embodiments, agglomerates produced by a method provided herein have a higher surface area than the petroleum-derived materials from which the agglomerates are produced. In some embodiments, agglomerates produced by a method provided herein have a lower surface area than the petroleum-derived materials from which the agglomerates are produced. In some embodiments, agglomerates produced by a method provided herein have a higher material strength than the petroleum-derived materials from which the agglomerates are produced. In some embodiments, agglomerates produced by a method provided herein have a lower material strength than the petroleum-derived materials from which the agglomerates are produced. In some embodiments, agglomerates produced by a method provided herein have a higher stiffness than the petroleum-derived materials from which the agglomerates are produced. In some embodiments, agglomerates produced by a method provided herein have a lower stiffness than the petroleum-derived materials from which the agglomerates are produced. In some embodiments, agglomerates produced by a method provided herein have a higher hardness than the petroleum-derived materials from which the agglomerates are produced. In some embodiments, agglomerates produced by a method provided herein have a lower hardness than the petroleum-derived materials from which the agglomerates are produced. In some embodiments, agglomerates produced by a method provided herein have a higher thermal conductivity than the petroleum-derived materials from which the agglomerates are produced. In some embodiments, agglomerates produced by a method provided herein have a lower thermal conductivity than the petroleum-derived materials from which the agglomerates are produced. In some embodiments, agglomerates produced by a method provided herein have a higher density than the petroleum-derived materials from which the agglomerates are produced. In some embodiments, agglomerates produced by a method provided herein have a lower density than the petroleum-derived materials from which the agglomerates are produced.

Pre-Treatment and Post-Treatment

In some embodiments, methods provided herein further comprise comminuting the plurality of petroleum-derived materials, such as by shredding, before contacting the petroleum-derived materials with the lipid composition.

In some embodiments, methods provided herein do not comprise sorting the petroleum-derived materials, cleaning the petroleum-derived materials, or both.

In some embodiments, methods provided herein further comprise a step of washing the agglomerate, e.g., with water. In some embodiments, methods provided herein further comprise a step of drying the agglomerate after it has been washed.

In some embodiments, methods provided herein further comprise extruding the agglomerate. In some embodiments, methods provided herein further comprise injecting the agglomerate into a mold. After injection into a mold, the agglomerate may shrink as it sets, thereby releasing itself from the mold and obviating the need for a release agent. In some embodiments, methods provided herein further comprise comminuting the agglomerate. In some embodiments, agglomerates produced by a method provided herein are in a chip or powder form suitable for use in production of plastic goods using standard manufacturing processes and equipment.

In some embodiments, methods provided herein further comprise combining the agglomerate with a starch such as cornstarch, in a starch:agglomerate ratio of from about 1:99 to about 1:4 by weight, such as about 1:99, about 1:90, about 1:50, about 1:20, about 1:10, about 1:9, about 1:8, about 1:7, about 1:6, about 1:5, or about 1:4 by weight; and comminuting the resulting combination to produce a powdered material. Such powdered materials may offer higher packing density relative to the petroleum-derived materials, resulting in increased ease of transport.

In some embodiments, methods provided herein further comprise combining the powdered material with a cement and a filler to produce a composite. The ratio of the cement to the powdered material may be about 1:1 by weight, and the ratio of the filler to the powdered material may be about 5:1 by weight. Slurries produced by combining the powdered material with a cement and a filler by a method provided herein may be less viscous and easier to pour than conventional concrete mixes.

In some embodiments, methods provided herein further comprise shaping the composite into a construction unit, such as a block, a paving stone, a tile, a beam, a sheet, or a board. In some embodiments, construction units produced by a method provided herein have a material strength (e.g., yield strength, compressive strength, tensile strength, fatigue strength, impact strength, etc.), stiffness, hardness, and/or thermal conductivity equivalent or superior to construction units produced through conventional processes. In some embodiments, less sand or gravel may be used to produce construction units by a method provided herein than through conventional processes.

In some embodiments, methods provided herein further comprise curing the agglomerate, such as through a heat treatment (e.g., at a temperature from about 40° C. to about 160° C.), a cryogenic treatment (e.g., at a temperature from about −20° C. to about 4° C.), a chemical treatment (e.g., with a peroxide, such as hydrogen peroxide), or any combination thereof.

In some embodiments, methods provided herein further comprise combining the agglomerate with a filler to produce a composite. Fillers include, but are not limited to, particulate solids (such as sand, glass, or wood residues such as chips, shavings, or sawdust), fibrous materials (such as a textile fibre such as hemp, cotton, linen, or wool, or a paper such as non-recyclable paper), and any combination thereof. The ratio of the filler combined with the agglomerate may be from about 1:99 to about 1:1 by weight, such as about 1:99, about 1:90, about 1:50, about 1:20, about 1:10, about 1:9, about 1:8, about 1:7, about 1:6, about 1:5, about 1:4, about 1:3, about 3:7, about 1:2, about 2:3, or about 1:1 by weight.

In some embodiments, methods provided herein further comprise combining a cement, such as a hydraulic cement, with the filler and the agglomerate. In some embodiments, the cement and the agglomerate are combined prior to combining with the filler. In some embodiments, the filler and the agglomerate are combined prior to combining with the cement. The ratio of the agglomerate combined with the cement may be from about 1:99 to about 4:1 by weight, such as about 1:99, about 1:90, about 1:50, about 1:20, about 1:10, about 1:9, about 1:8, about 1:7, about 1:6, about 1:5, about 1:4, about 1:3, about 3:7, about 1:2, about 2:3, about 1:1, about 3:2, about 2:1, about 7:3, about 3:1, or about 4:1 by weight. In some embodiments, the amount of water used to cure the hydraulic cement in a method provided herein is less than about 10 wt % or less than about 5 wt % of the total materials in the resulting composite.

In some embodiments, methods provided herein further comprise combining the agglomerate and a bitumen to form a paving material. Paving materials produced by a method provided herein may be less stiff, have a higher tensile strength, and/or be less water-permeable than standard asphalt paving materials. Bitumen may be obtained fresh (e.g., through petroleum refining) or from recycled asphalt pavement or shingles, which may optionally be ground to an aggregate size. The ratio of the bitumen combined with the agglomerate may be from about 1:99 to about 99:1 by weight, such as about 1:99, about 1:90, about 1:50, about 1:20, about 1:10, about 1:9, about 1:8, about 1:7, about 1:6, about 1:5, about 1:4, about 1:3, about 3:7, about 1:2, about 2:3, about 1:1, about 3:2, about 2:1, about 7:3, about 3:1, about 4:1, about 5:1, about 6:1, about 7:1, about 8:1, about 9:1, about 10:1, about 20:1, about 50:1, about 90:1, or about 99:1 by weight. The ratio of the bitumen combined with the agglomerate may be from about 3:7 to about 2:3 by weight.

Systems and Apparatuses

In another aspect, there is provided herein a system, comprising: a vessel configured for contacting a plurality of petroleum-derived materials with a lipid composition comprising fatty acid moieties to produce an agglomerate, wherein from about 9 wt % to about 40 wt % of the fatty acid moieties are saturated, and wherein at least about 0.5 wt % of the fatty acid moieties are monounsaturated; and a first outlet configured for discharging at least a portion of the agglomerate from the vessel.

In some embodiments, systems provided herein are for recycling petroleum-derived materials.

In some embodiments, the system further comprises a first inlet configured for receiving the petroleum-derived materials in the vessel. In some embodiments, the system further comprises at least one second inlet configured for receiving the lipid composition in the vessel. In some embodiments, the at least one second inlet is a spray nozzle.

In some embodiments, the vessel is configured for mixing the lipid composition with the petroleum-derived materials. In some embodiments, the vessel is a batch mixer, such as a drum mixer, pan mixer, blade mixer (e.g., a double-arm Z-blade mixer, such as that manufactured by SIGMA Equipment), paddle mixer, ribbon mixer, diving-arm mixer, screw mixer, twin-screw mixer, V mixer, or double cone mixer.

In some embodiments, the vessel is configured (e.g., in the form of a cyclone) for spraying (e.g., through at least one spray nozzle) the lipid composition on the petroleum-derived materials.

In some embodiments, the vessel is configured (e.g., in the form of a slide) for soaking (e.g., submerging or coating) the petroleum-derived materials in the lipid composition.

In some embodiments, the vessel is heated.

In some embodiments, the system is configured for receiving a filler into the vessel to produce a composite. In some embodiments, the system further comprises at least one third inlet configured for receiving a filler into the vessel.

In some embodiments, the system is configured for separating the agglomerate from the lipid composition. In some embodiments, the first outlet is configured for extruding at least a portion of the agglomerate from the vessel, such as with an auger. In some embodiments, the system further comprises a second outlet configured for discharging at least a portion of the lipid composition from the vessel.

In some embodiments, the system is configured for recycling at least a portion of the lipid composition.

In some embodiments, the system further comprises a comminuting module for comminuting the petroleum-derived materials, e.g., by shredding, before the petroleum-derived materials enter the vessel. In some embodiments, the system further comprises a feeder module for feeding the petroleum-derived materials into the vessel. In some embodiments, the system further comprises a premixing module for mixing the petroleum-derived materials before they enter the vessel.

In some embodiments, the system further comprises a washing module for washing the agglomerate, e.g., with water. In some embodiments, the system further comprises a drying module for drying the agglomerate after it has been washed.

In some embodiments, the system further comprises a conveyor, such as a belt or an auger, configured for conveying the agglomerate discharged from the first outlet to a remote location.

Multiple systems provided herein may be connected in parallel or in series, e.g., for efficiency of operation, or for multi-step processing of petroleum-derived materials.

In another aspect, there is provided an apparatus for producing an extrudate from petroleum-derived materials, comprising:

(a) a pre-extrusion mixer for contacting a plurality of petroleum-derived materials with a lipid composition comprising fatty acid moieties and a filler to produce a composite, having one or more inlets for receiving the petroleum-derived materials and the lipid composition, and an outlet for discharging the composite; and (b) an extruder in fluid communication with the outlet of the pre-extrusion mixer for receiving the composite therefrom.

In some embodiments, the extruder comprises a barrel and a rotatable power screw extending continuously therein between an inlet end and a discharge end of the barrel, the barrel having an inlet port at the inlet end, the inlet port being in fluid communication with the outlet of the pre-extrusion mixer for receiving the composite therefrom. In some embodiments, the power screw has substantially continuous thread means of generally helical configuration.

In some embodiments, the apparatus further comprises a preforming device directly positioned at the discharge end of the extruder for forming the extrudate into a billet with a predetermined cross section, the preforming device comprising a discharge end through which a measured volume of the billet is discharged. In some embodiments, the apparatus further comprises a cutting device positioned for movement across the discharge end of the preforming device to cut the elongated billet to a predetermined length.

In some embodiments, the apparatus further comprises a secondary mixer for contacting a plurality of petroleum-derived materials with a lipid composition comprising fatty acid moieties and a filler to produce an agglomerate, the secondary mixer having one or more inlets for receiving the petroleum-derived materials and the lipid composition, and an outlet in fluid communication with an inlet of the pre-extrusion mixer for discharging the agglomerate into the pre-extrusion mixer.

In some embodiments, the apparatus further comprises a pre-mixer for contacting a plurality of petroleum-derived materials that are not plastic packaging with a lipid composition, the pre-mixer having one or more inlets for receiving the petroleum-derived materials and the lipid composition, and an outlet in fluid communication with an inlet of the secondary mixer for discharging the pre-mixed composition into the secondary mixer, wherein another inlet of the secondary mixer is configured for receiving a composition comprising plastic packaging.

In some embodiments, the mixers in the apparatus are batch mixers, such as a drum mixer, pan mixer, blade mixer (e.g., a double-arm Z-blade mixer, such as that manufactured by SIGMA Equipment), paddle mixer, ribbon mixer, diving-arm mixer, screw mixer, twin-screw mixer, V mixer, or double cone mixer. In some embodiments, the pre-extrusion mixer and the secondary mixer are double-arm Z-blade mixers, and the pre-mixer is a blade mixer with narrow and curved blades. In some embodiments, the mixers in the apparatus are heated.

Embodiments

Particular embodiments include, without limitation, the following:

1. A method, comprising contacting a plurality of petroleum-derived materials with a lipid composition comprising fatty acid moieties to produce an agglomerate, wherein from about 9 wt % to about 40 wt % of the fatty acid moieties are saturated, and wherein at least about 0.5 wt % of the fatty acid moieties are monounsaturated.

2. The method of embodiment 1, wherein the method is for recycling petroleum-derived materials.

3. The method of embodiment 1 or 2, wherein the plurality of petroleum-derived materials comprise plastic, wax, resin, or a combination thereof.

4. The method of embodiment 3, wherein the plurality of petroleum-derived materials comprise plastic or a mixture of plastic.

5. The method of embodiment 4, wherein the plastic is plastic packaging.

6. The method of embodiment 5, wherein the plastic packaging comprises a plastic film, a plastic container, or both.

7. The method of embodiment 6, wherein the plastic film is a bag, liner, wrap, tape, label, or any combination thereof.

8. The method of embodiment 6, wherein the plastic container is a tray, lid, bottle, bottle cap, or any combination thereof.

9. The method of embodiment 4, wherein the plastic is rigid plastic.

10. The method of embodiment 4, wherein the plastic is in the form of a seal, wire or cable jacket, floor covering, or filter.

11. The method of embodiment 4, wherein the plastic is in the form of a vehicle part, e.g., a lamp, grille, dashboard, bumper, fluid tank, handle, button, casing, container, clamp, or socket.

12. The method of embodiment 4, wherein the plastic is extruded, molded, cast, foamed, or any combination thereof.

13. The method of embodiment 12, wherein the plastic is extruded, e.g., into a sheet or film.

14. The method of embodiment 12, wherein the plastic is molded, e.g., into a tray, utensil, straw, stirrer, lid, bottle, bottle cap, or any combination thereof.

15. The method of embodiment 12, wherein the plastic is foamed, e.g., an insulation or soundproofing foam.

16. The method of embodiment 4, wherein the plastic is in the form of a woven or nonwoven fabric, such as protective apparel (e.g., medical or surgical gown, mask, cover, or cap), bed linen, drape, wound dressing, hygiene product (e.g., wipe), liner, or upholstery.

17. A method, comprising:

(a) contacting a plurality of petroleum-derived materials that are not plastic packaging with a first lipid composition comprising fatty acid moieties, wherein from about 9 wt % to about 40 wt % of the fatty acid moieties are saturated, and wherein at least about 0.5 wt % of the fatty acid moieties are monounsaturated; and (b) combining the mixture resulting from step (a) with a composition comprising plastic packaging to produce an agglomerate.

18. The method of embodiment 17, wherein the method is for recycling petroleum-derived materials.

19. The method of embodiment 17 or 18, in step (b) further comprising combining a second lipid composition with the mixture resulting from step (a) and the composition, wherein the second lipid composition comprises fatty acid moieties, wherein from about 9 wt % to about 40 wt % of the fatty acid moieties are saturated, and wherein at least about 0.5 wt % of the fatty acid moieties are monounsaturated, wherein the second lipid composition is the same as or different from the first composition.

20. The method of any one of embodiments 17 to 19, wherein the plastic packaging comprises a plastic film, a plastic container, or both.

21. The method of embodiment 20, wherein the plastic film is a bag, liner, wrap, tape, label, or any combination thereof.

22. The method of embodiment 20, wherein the plastic container is a tray, lid, bottle, bottle cap, or any combination thereof.

23. The method of any one of embodiments 17 to 22, wherein the plurality of petroleum-derived materials comprise plastic, wax, resin, or a combination thereof.

24. The method of embodiment 23, wherein the plurality of petroleum-derived materials comprise plastic or a mixture of plastic.

25. The method of embodiment 24, wherein the plastic is rigid plastic.

26. The method of embodiment 24, wherein the plastic is in the form of a seal, wire or cable jacket, floor covering, or filter.

27. The method of embodiment 24, wherein the plastic is in the form of a vehicle part, e.g., a lamp, grille, dashboard, bumper, fluid tank, handle, button, casing, container, clamp, or socket.

28. The method of embodiment 24, wherein the plastic is in the form of a woven or nonwoven fabric, such as protective apparel (e.g., medical or surgical gown, mask, cover, or cap), bed linen, drape, wound dressing, hygiene product (e.g., wipe), liner, or upholstery.

29. The method of embodiment 24, wherein the plastic is molded, cast, foamed, or any combination thereof.

30. The method of embodiment 29, wherein the plastic is molded, e.g., into a tray, utensil, straw, stirrer, lid, bottle, bottle cap, or any combination thereof.

31. The method of embodiment 29, wherein the plastic is foamed, e.g., an insulation or soundproofing foam.

32. The method of any one of embodiments 3 to 16 or 24 to 31, wherein the plastic comprises polyethylene (such as HDPE, LDPE, or PEX), polypropylene, polystyrene, polyvinyl chloride (such as crosslinked polyvinyl chloride), polyamide (such as a nylon or a crosslinked polyamide), polyester (such as polybutylene terephthalate or polyethylene terephthalate), acrylonitrile butadiene styrene, polycarbonate, polyoxymethylene, or any combination or blend thereof.

33. The method of embodiment 32, wherein the plastic comprises polyethylene and polypropylene.

34. The method of embodiment 32, wherein the plastic comprises polyethylene, polypropylene, polystyrene, and polyethylene terephthalate.

35. The method of embodiment 32, wherein the plastic is polyethylene.

36. The method of embodiment 32, wherein the plastic is polypropylene.

37. The method of embodiment 32, wherein the plastic is polystyrene.

38. The method of embodiment 32, wherein the plastic is polyethylene terephthalate.

39. The method of any one of embodiments 3 to 16 or 24 to 38, wherein the plastic comprises an elastomer, such as a natural rubber, thermoplastic rubber, neoprene, styrene-butadiene rubber, polybutadiene, nitrile rubber, butyl rubber, or ethylene propylene diene monomer (EPDM) rubber.

40. The method of any one of embodiments 3 to 16 or 24 to 39, wherein the plastic is reinforced with a filler, e.g., glass fiber, carbon fiber, or glass beads.

41. The method of any one of embodiments 3 to 16 or 24 to 40, wherein the plastic is combined with an additive, such as a flame retardant.

42. The method of any one of embodiments 3 to 16 or 24 to 41, wherein the plastic is sorted.

43. The method of any one of embodiments 3 to 16 or 24 to 41, wherein the plastic is unsorted.

44. The method of any one of embodiments 3 to 16 or 24 to 43, wherein the plastic is cleaned.

45. The method of any one of embodiments 3 to 16 or 24 to 43, wherein the plastic is not cleaned.

46. The method of any one of embodiments 3 to 16 or 24 to 45, wherein the plastic is waste plastic, such as post-consumer plastic (e.g., household waste, commercial waste, or healthcare textile waste), pre-consumer plastic (e.g., post-commercial plastic packaging), post-industrial plastic (e.g., vehicle plastic scrap), or end-of-life plastic (e.g., end-of-life vehicle, electronic, or appliance waste).

47. The method of any one of embodiments 3 to 16 or 24 to 45, wherein the plastic is a mix of virgin plastic and waste plastic.

48. The method of any one of embodiments 3 to 16 or 24 to 47, wherein the plastic is classified according to the ASTM International Resin Identification Coding (RIC) System (ASTM D7611) as type 1, type 2, type 3, type 4, type 5, type 6, type 7, or a combination thereof.

49. The method of any one of embodiments 1 to 48, wherein the petroleum-derived materials are provided in combination with paper, such as wax paper or photographic paper.

50. The method of any one of embodiments 1 to 49, wherein the contacting comprises spraying the lipid composition on the petroleum-derived materials, soaking the petroleum-derived materials in the lipid composition, and/or mixing the lipid composition with the petroleum-derived materials.

51. The method of embodiment 50, wherein the contacting comprises spraying the lipid composition on the petroleum-derived materials.

52. The method of embodiment 50, wherein the contacting comprises soaking the petroleum-derived materials in the lipid composition.

53. The method of embodiment 50, wherein the contacting comprises mixing the lipid composition with the petroleum-derived materials.

54. The method of any one of embodiments 1 to 53, wherein at least a portion of the plurality of petroleum-derived materials subjected to a method provided herein is not melted, such as at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 99 wt %, or the entirety of the plurality of petroleum-derived materials.

55. The method of any one of embodiments 1 to 54, wherein at least a portion of the plurality of petroleum-derived materials subjected to a method provided herein does not degrade, e.g., chemically or physically, such as at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 99 wt %, or the entirety of the plurality of petroleum-derived materials.

56. The method of any one of embodiments 1 to 55, wherein the lipid composition is provided at a temperature lower than the highest softening point of the petroleum-derived materials.

57. The method of any one of embodiments 1 to 55, wherein the lipid composition is provided at a temperature lower than the lowest softening point of the petroleum-derived materials.

58. The method of any one of embodiments 1 to 57, wherein the lipid composition does not produce smoke or fumes.

59. The method of any one of embodiments 1 to 58, wherein the lipid composition is provided at a temperature lower than the smoke point of the lipid composition.

60. The method of any one of embodiments 1 to 59, wherein the lipid composition is provided at a temperature from about 40° C. to about 160° C., from about 40° C. to about 155° C., from about 40° C. to about 150° C., from about 40° C. to about 145° C., from about 40° C. to about 140° C., from about 40° C. to about 135° C., from about 40° C. to about 130° C., from about 40° C. to about 125° C., from about 40° C. to about 120° C., from about 40° C. to about 115° C., from about 40° C. to about 110° C., from about 40° C. to about 105° C., from about 40° C. to about 100° C., from about 40° C. to about 95° C., from about 40° C. to about 90° C., from about 40° C. to about 85° C., from about 40° C. to about 80° C., from about 40° C. to about 75° C., from about 40° C. to about 70° C., from about 40° C. to about 65° C., from about 40° C. to about 60° C., from about 40° C. to about 55° C., from about 40° C. to about 50° C., from about 40° C. to about 45° C., from about 45° C. to about 160° C., from about 45° C. to about 155° C., from about 45° C. to about 150° C., from about 45° C. to about 145° C., from about 45° C. to about 140° C., from about 45° C. to about 135° C., from about 45° C. to about 130° C., from about 45° C. to about 125° C., from about 45° C. to about 120° C., from about 45° C. to about 115° C., from about 45° C. to about 110° C., from about 45° C. to about 105° C., from about 45° C. to about 100° C., from about 45° C. to about 95° C., from about 45° C. to about 90° C., from about 45° C. to about 85° C., from about 45° C. to about 80° C., from about 45° C. to about 75° C., from about 45° C. to about 70° C., from about 45° C. to about 65° C., from about 45° C. to about 60° C., from about 45° C. to about 55° C., from about 45° C. to about 50° C., from about 50° C. to about 160° C., from about 50° C. to about 155°

C., from about 50° C. to about 150° C., from about 50° C. to about 145° C., from about 50° C. to about 140° C., from about 50° C. to about 135° C., from about 50° C. to about 130° C., from about 50° C. to about 125° C., from about 50° C. to about 120° C., from about 50° C. to about 115° C., from about 50° C. to about 110° C., from about 50° C. to about 105° C., from about 50° C. to about 100° C., from about 50° C. to about 95° C., from about 50° C. to about 90° C., from about 50° C. to about 85° C., from about 50° C. to about 80° C., from about 50° C. to about 75° C., from about 50° C. to about 70° C., from about 50° C. to about 65° C., from about 50° C. to about 60° C., from about 50° C. to about 55° C., from about 55° C. to about 160° C., from about 55° C. to about 155° C., from about 55° C. to about 150° C., from about 55° C. to about 145° C., from about 55° C. to about 140° C., from about 55° C. to about 135° C., from about 55° C. to about 130° C., from about 55° C. to about 125° C., from about 55° C. to about 120° C., from about 55° C. to about 115° C., from about 55° C. to about 110° C., from about 55° C. to about 105° C., from about 55° C. to about 100° C., from about 55° C. to about 95° C., from about 55° C. to about 90° C., from about 55° C. to about 85° C., from about 55° C. to about 80° C., from about 55° C. to about 75° C., from about 55° C. to about 70° C., from about 55° C. to about 65° C., from about 55° C. to about 60° C., from about 60° C. to about 160° C., from about 60° C. to about 155° C., from about 60° C. to about 150° C., from about 60° C. to about 145° C., from about 60° C. to about 140° C., from about 60° C. to about 135° C., from about 60° C. to about 130° C., from about 60° C. to about 125° C., from about 60° C. to about 120° C., from about 60° C. to about 115° C., from about 60° C. to about 110° C., from about 60° C. to about 105° C., from about 60° C. to about 100° C., from about 60° C. to about 95° C., from about 60° C. to about 90° C., from about 60° C. to about 85° C., from about 60° C. to about 80° C., from about 60° C. to about 75° C., from about 60° C. to about 70° C., from about 60° C. to about 65° C., from about 65° C. to about 160° C., from about 65° C. to about 155° C., from about 65° C. to about 150° C., from about 65° C. to about 145° C., from about 65° C. to about 140° C., from about 65° C. to about 135° C., from about 65° C. to about 130° C., from about 65° C. to about 125° C., from about 65° C. to about 120° C., from about 65° C. to about 115° C., from about 65° C. to about 110° C., from about 65° C. to about 105° C., from about 65° C. to about 100° C., from about 65° C. to about 95° C., from about 65° C. to about 90° C., from about 65° C. to about 85° C., from about 65° C. to about 80° C., from about 65° C. to about 75° C., from about 65° C. to about 70° C., from about 70° C. to about 160° C., from about 70° C. to about 155° C., from about 70° C. to about 150° C., from about 70° C. to about 145° C., from about 70° C. to about 140° C., from about 70° C. to about 135° C., from about 70° C. to about 130° C., from about 70° C. to about 125° C., from about 70° C. to about 120° C., from about 70° C. to about 115° C., from about 70° C. to about 110° C., from about 70° C. to about 105° C., from about 70° C. to about 100° C., from about 70° C. to about 95° C., from about 70° C. to about 90° C., from about 70° C. to about 85° C., from about 70° C. to about 80° C., from about 70° C. to about 75° C., from about 75° C. to about 160° C., from about 75° C. to about 155° C., from about 75° C. to about 150° C., from about 75° C. to about 145° C., from about 75° C. to about 140° C., from about 75° C. to about 135° C., from about 75° C. to about 130° C., from about 75° C. to about 125° C., from about 75° C. to about 120° C., from about 75° C. to about 115° C., from about 75° C. to about 110° C., from about 75° C. to about 105° C., from about 75° C. to about 100° C., from about 75° C. to about 95° C., from about 75° C. to about 90° C., from about 75° C. to about 85° C., from about 75° C. to about 80° C., from about 80° C. to about 160° C., from about 80° C. to about 155° C., from about 80° C. to about 150° C., from about 80° C. to about 145° C., from about 80° C. to about 140° C., from about 80° C. to about 135° C., from about 80° C. to about 130° C., from about 80° C. to about 125° C., from about 80° C. to about 120° C., from about 80° C. to about 115° C., from about 80° C. to about 110° C., from about 80° C. to about 105° C., from about 80° C. to about 100° C., from about 80° C. to about 95° C., from about 80° C. to about 90° C., from about 80° C. to about 85° C., from about 85° C. to about 160° C., from about 85° C. to about 155° C., from about 85° C. to about 150° C., from about 85° C. to about 145° C., from about 85° C. to about 140° C., from about 85° C. to about 135° C., from about 85° C. to about 130° C., from about 85° C. to about 125° C., from about 85° C. to about 120° C., from about 85° C. to about 115° C., from about 85° C. to about 110° C., from about 85° C. to about 105° C., from about 85° C. to about 100° C., from about 85° C. to about 95° C., from about 85° C. to about 90° C., from about 90° C. to about 160° C., from about 90° C. to about 155° C., from about 90° C. to about 150° C., from about 90° C. to about 145° C., from about 90° C. to about 140° C., from about 90° C. to about 135° C., from about 90° C. to about 130° C., from about 90° C. to about 125° C., from about 90° C. to about 120° C., from about 90° C. to about 115° C., from about 90° C. to about 110° C., from about 90° C. to about 105° C., from about 90° C. to about 100° C., from about 90° C. to about 95° C., from about 95° C. to about 160° C., from about 95° C. to about 155° C., from about 95° C. to about 150° C., from about 95° C. to about 145° C., from about 95° C. to about 140° C., from about 95° C. to about 135° C., from about 95° C. to about 130° C., from about 95° C. to about 125° C., from about 95° C. to about 120° C., from about 95° C. to about 115° C., from about 95° C. to about 110° C., from about 95° C. to about 105° C., from about 95° C. to about 100° C., from about 100° C. to about 160° C., from about 100° C. to about 155° C., from about 100° C. to about 150° C., from about 100° C. to about 145° C., from about 100° C. to about 140° C., from about 100° C. to about 135° C., from about 100° C. to about 130° C., from about 100° C. to about 125° C., from about 100° C. to about 120° C., from about 100° C. to about 115° C., from about 100° C. to about 110° C., from about 100° C. to about 105° C., from about 105° C. to about 160° C., from about 105° C. to about 155° C., from about 105° C. to about 150° C., from about 105° C. to about 145° C., from about 105° C. to about 140° C., from about 105° C. to about 135° C., from about 105° C. to about 130° C., from about 105° C. to about 125° C., from about 105° C. to about 120° C., from about 105° C. to about 115° C., from about 105° C. to about 110° C., from about 110° C. to about 160° C., from about 110° C. to about 155° C., from about 110° C. to about 150° C., from about 110° C. to about 145° C., from about 110° C. to about 140° C., from about 110° C. to about 135° C., from about 110° C. to about 130° C., from about 110° C. to about 125° C., from about 110° C. to about 120° C., from about 110° C. to about 115° C., from about 115° C. to about 160° C., from about 115° C. to about 155° C., from about 115° C. to about 150° C., from about 115° C. to about 145° C., from about 115° C. to about 140° C., from about 115° C. to about 135° C., from about 115° C. to about 130° C., from about 115° C. to about 125° C., from about 115° C. to about 120° C., from about 120° C. to about 160° C., from about 120° C. to about 155° C., from about 120° C. to about 150° C., from about 120° C. to about 145° C., from about 120° C. to about 140° C., from about 120° C. to about 135° C., from about 120° C. to about 130° C., from about 120° C. to about 125° C., from about 125° C. to about 160° C., from about 125° C. to about 155° C., from about 125° C. to about 150° C., from about 125° C. to about 145° C., from about 125° C. to about 140° C., from about 125° C. to about 135° C., from about 125° C. to about 130° C., from about 130° C. to about 160° C., from about 130° C. to about 155° C., from about 130° C. to about 150° C., from about 130° C. to about 145° C., from about 130° C. to about 140° C., from about 130° C. to about 135° C., from about 135° C. to about 160° C., from about 135° C. to about 155° C., from about 135° C. to about 150° C., from about 135° C. to about 145° C., from about 135° C. to about 140° C., from about 140° C. to about 160° C., from about 140° C. to about 155° C., from about 140° C. to about 150° C., from about 140° C. to about 145° C., from about 145° C. to about 160° C., from about 145° C. to about 155° C., from about 145° C. to about 150° C., from about 150° C. to about 160° C., from about 150° C. to about 155° C., or from about 155° C. to about 160° C.

61. The method of any one of embodiments 1 to 59, wherein the lipid composition is provided at a temperature of about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 75° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., about 110° C., about 111° C., about 112° C., about 113° C., about 114° C., about 115° C., about 116° C., about 117° C., about 118° C., about 119° C., about 110° C., about 111° C., about 112° C., about 113° C., about 114° C., about 115° C., about 116° C., about 117° C., about 118° C., about 119° C., about 120° C., about 121° C., about 122° C., about 123° C., about 124° C., about 125° C., about 126° C., about 127° C., about 128° C., about 129° C., about 130° C., about 131° C., about 132° C., about 133° C., about 134° C., about 135° C., about 136° C., about 137° C., about 138° C., about 139° C., about 140° C., about 141° C., about 142° C., about 143° C., about 144° C., about 145° C., about 146° C., about 147° C., about 148° C., about 149° C., about 150° C., about 151° C., about 152° C., about 153° C., about 154° C., about 155° C., about 156° C., about 157° C., about 158° C., about 159° C., or about 160° C.

62. The method of embodiment 61, wherein the lipid composition is provided at a temperature of about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 75° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., about 110° C., about 111° C., about 112° C., about 113° C., or about 114° C.

63. The method of embodiment 61, wherein the lipid composition is provided at a temperature of about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 75° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., about 100° C., about 101° C., about 102° C., about 103° C., or about 104° C.

64. The method of embodiment 61, wherein the lipid composition is provided at a temperature of about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 75° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., or about 84° C.

65. The method of any one of embodiments 1 to 64, wherein the petroleum-derived materials are contacted with the lipid composition for about 1 s to about 60 min, for about 1 s to about 10 min, for about 1 s to about 1 min, for about 1 s to about 10 s, for about 10 s to about 60 min, for about 10 s to about 10 min, for about 10 s to about 1 min, for about 1 min to about 60 min, for about 1 min to about 10 min, or for about 10 min to about 60 min.

66. The method of any one of embodiments 1 to 64, wherein the petroleum-derived materials are contacted with the lipid composition for about 1 s, about 2 s, about 3 s, about 4 s, about 5 s, about 6 s, about 7 s, about 8 s, about 9 s, about 10 s, about 15 s, about 30 s, about 45 s, about 1 min, about 2 min, about 3 min, about 4 min, about 5 min, about 6 min, about 7 min, about 8 min, about 9 min, about 10 min, about 15 min, about 20 min, about 25 min, about 30 min, about 35 min, about 40 min, about 45 min, about 50 min, about 55 min, or about 60 min.

67. The method of any one of embodiments 1 to 64, wherein the petroleum-derived materials are contacted with the lipid composition for no longer than 1 s, no longer than 2 s, no longer than 3 s, no longer than 4 s, no longer than 5 s, no longer than 6 s, no longer than 7 s, no longer than 8 s, no longer than 9 s, no longer than 10 s, no longer than 15 s, no longer than 30 s, no longer than 45 s, no longer than 1 min, no longer than 2 min, no longer than 3 min, no longer than 4 min, no longer than 5 min, no longer than 6 min, no longer than 7 min, no longer than 8 min, no longer than 9 min, no longer than 10 min, no longer than 15 min, no longer than 20 min, no longer than 25 min, no longer than 30 min, no longer than 35 min, no longer than 40 min, no longer than 45 min, no longer than 50 min, no longer than 55 min, or no longer than 60 min.

68. The method of any one of embodiments 1 to 67, wherein the petroleum-derived materials become sterilized.

69. The method of any one of embodiments 1 to 68, wherein the petroleum-derived materials and the lipid composition are contacted in a weight ratio of from about 100:1 to about 4:1, such as about 100:1, about 50:1, about 40:1, about 35:1, about 32:1, about 30:1, about 25:1, about 20:1, about 15:1, about 10:1, about 9:1, about 8:1, about 7:1, about 6:1, about 5:1, or about 4:1.

70. The method of any one of embodiments 1 to 69, wherein the fatty acid moieties are free fatty acids, fatty acid esters, fatty alcohols, or any combination thereof.

71. The method of embodiment 70, wherein the free fatty acid is a saturated fatty acid such as palmitic acid or stearic acid, a monounsaturated fatty acid such as oleic acid, a polyunsaturated fatty acid such as linoleic acid, conjugated linoleic acid, or linolenic acid, or any combination thereof.

72. The method of embodiment 70 or 71, wherein the fatty acid ester is a saturated fatty acid ester such as palmitate or stearate, a monounsaturated fatty acid ester such as oleate, a polyunsaturated fatty acid ester such as linoleate or linolenate, or any combination thereof.

73. The method of any one of embodiments 70 to 72, wherein the fatty acid ester is a triglyceride, such as a medium-chain triglyceride or a long-chain triglyceride.

74. The method of embodiment 73, wherein the triglyceride is an edible oil.

75. The method of embodiment 74, wherein the edible oil is an animal oil, plant oil, or any combination thereof.

76. The method of embodiment 75, wherein the plant oil is adjouaba oil, African bean oil, amaranth oil, argan oil, artichoke oil, avocado oil, black cumin oil, borage oil, buckwheat oil, cactus pear oil, camelina oil, chia oil, corn oil, cotton seed oil, cranberry seed oil, cumin oil, fenugreek oil, gokhru oil, hemp oil, kenaf oil, linseed oil, lupin oil, macadamia nut oil, melon seed oil, niger seed oil, oat oil, olive oil, onion oil, paprika seed oil, peanut oil, perilla oil, pistachio oil, pumpkin seed oil, purslane oil, quinoa oil, ratanjyot oil, sea buckthorn berry oil, sea buckthorn seed oil, silver maple seed oil, stock oil, sugar maple seed oil, rice bran oil, safflower oil, salicorn oil, sesame oil, soybean oil, sunflower oil, thumba oil, tobacco seed oil, watermelon seed oil, wheat germ oil, or any combination thereof.

77. The method of embodiment 76, wherein the plant oil is corn oil, linseed oil, olive oil, peanut oil, safflower oil, sesame oil, sunflower oil, or any combination thereof.

78. The method of embodiment 77, wherein the plant oil is corn oil, olive oil, peanut oil, or any combination thereof.

79. The method of embodiment 78, wherein the plant oil is corn oil.

80. The method of embodiment 78, wherein the plant oil is olive oil.

81. The method of embodiment 78, wherein the plant oil is peanut oil.

82. The method of any one of embodiments 1 to 75, wherein from about 10 wt % to about 40 wt %, from about 15 wt % to about 40 wt %, from about 20 wt % to about 40 wt %, from about 25 wt % to about 40 wt %, from about 30 wt % to about 40 wt %, from about 35 wt % to about 40 wt %, from about 9 wt % to about 35 wt %, from about 10 wt % to about 35 wt %, from about 15 wt % to about 35 wt %, from about 20 wt % to about 35 wt %, from about 25 wt % to about 35 wt %, from about 30 wt % to about 35 wt %, from about 9 wt % to about 30 wt %, from about 10 wt % to about 30 wt %, from about 15 wt % to about 30 wt %, from about 20 wt % to about 30 wt %, from about 25 wt % to about 30 wt %, from about 9 wt % to about 25 wt %, from about 10 wt % to about 25 wt %, from about 15 wt % to about 25 wt %, from about 20 wt % to about 25 wt %, from about 9 wt % to about 20 wt %, from about 10 wt % to about 20 wt %, from about 15 wt % to about 20 wt %, from about 9 wt % to about 15 wt %, from about 10 wt % to about 15 wt %, or from about 9 wt % to about 10 wt % of the fatty acid moieties are saturated.

83. The method of any one of embodiments 1 to 75, wherein at least about 1 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, 11 wt %, at least about 12 wt %, at least about 13 wt %, at least about 14 wt %, at least about 15 wt %, at least about 16 wt %, at least about 17 wt %, at least about 18 wt %, at least about 19 wt %, at least about 20 wt %, at least about 21 wt %, at least about 22 wt %, at least about 23 wt %, at least about 24 wt %, at least about 25 wt %, at least about 26 wt %, at least about 27 wt %, at least about 28 wt %, at least about 29 wt %, at least about 30 wt %, at least about 31 wt %, at least about 32 wt %, at least about 33 wt %, at least about 34 wt %, at least about 35 wt %, at least about 36 wt %, at least about 37 wt %, at least about 38 wt %, at least about 39 wt %, at least about 40 wt %, at least about 41 wt %, at least about 42 wt %, at least about 43 wt %, at least about 44 wt %, at least about 45 wt %, at least about 46 wt %, at least about 47 wt %, at least about 48 wt %, at least about 49 wt %, at least about 50 wt %, at least about 51 wt %, at least about 52 wt %, at least about 53 wt %, at least about 54 wt %, at least about 55 wt %, at least about 56 wt %, at least about 57 wt %, at least about 58 wt %, at least about 59 wt %, at least about 60 wt %, at least about 61 wt %, at least about 62 wt %, at least about 63 wt %, at least about 64 wt %, at least about 75 wt %, at least about 66 wt %, at least about 67 wt %, at least about 68 wt %, at least about 69 wt %, at least about 70 wt %, at least about 71 wt %, at least about 72 wt %, or at least about 73 wt % of the fatty acid moieties are monounsaturated.

84. The method of any one of embodiments 1 to 75, wherein from about 14 wt % to about 16 wt % of the fatty acid moieties are saturated, from about 27 wt % to about 29 wt % of the fatty acid moieties are monounsaturated, and from about 56 wt % to about 58 wt % of the fatty acid moieties are polyunsaturated.

85. The method of any one of embodiments 1 to 75, wherein from about 13 wt % to about 17 wt % of the fatty acid moieties are saturated, from about 26 wt % to about 30 wt % of the fatty acid moieties are monounsaturated, and from about 55 wt % to about 59 wt % of the fatty acid moieties are polyunsaturated.

86. The method of any one of embodiments 1 to 75, wherein from about 12 wt % to about 18 wt % of the fatty acid moieties are saturated, from about 25 wt % to about 31 wt % of the fatty acid moieties are monounsaturated, and from about 54 wt % to about 60 wt % of the fatty acid moieties are polyunsaturated 87. The method of any one of embodiments 1 to 75, wherein from about 11 wt % to about 19 wt % of the fatty acid moieties are saturated, from about 24 wt % to about 32 wt % of the fatty acid moieties are monounsaturated, and from about 53 wt % to about 61 wt % of the fatty acid moieties are polyunsaturated.

88. The method of any one of embodiments 1 to 75, wherein from about 10 wt % to about 20 wt % of the fatty acid moieties are saturated, from about 23 wt % to about 33 wt % of the fatty acid moieties are monounsaturated, and from about 52 wt % to about 62 wt % of the fatty acid moieties are polyunsaturated.

89. The method of any one of embodiments 1 to 75, wherein from about 14 wt % to about 16 wt % of the fatty acid moieties are saturated, from about 73 wt % to about 75 wt % of the fatty acid moieties are monounsaturated, and from about 9 wt % to about 11 wt % of the fatty acid moieties are polyunsaturated.

90. The method of any one of embodiments 1 to 75, wherein from about 13 wt % to about 17 wt % of the fatty acid moieties are saturated, from about 72 wt % to about 76 wt % of the fatty acid moieties are monounsaturated, and from about 8 wt % to about 12 wt % of the fatty acid moieties are polyunsaturated.

91. The method of any one of embodiments 1 to 75, wherein from about 12 wt % to about 18 wt % of the fatty acid moieties are saturated, from about 71 wt % to about 77 wt % of the fatty acid moieties are monounsaturated, and from about 7 wt % to about 13 wt % of the fatty acid moieties are polyunsaturated.

92. The method of any one of embodiments 1 to 75, wherein from about 11 wt % to about 19 wt % of the fatty acid moieties are saturated, from about 70 wt % to about 78 wt % of the fatty acid moieties are monounsaturated, and from about 6 wt % to about 14 wt % of the fatty acid moieties are polyunsaturated.

93. The method of any one of embodiments 1 to 75, wherein from about 10 wt % to about 20 wt % of the fatty acid moieties are saturated, from about 69 wt % to about 79 wt % of the fatty acid moieties are monounsaturated, and from about 5 wt % to about 15 wt % of the fatty acid moieties are polyunsaturated.

94. The method of any one of embodiments 1 to 75, wherein from about 17 wt % to about 19 wt % of the fatty acid moieties are saturated, from about 49 wt % to about 51 wt % of the fatty acid moieties are monounsaturated, and from about 30 wt % to about 32 wt % of the fatty acid moieties are polyunsaturated.

95. The method of any one of embodiments 1 to 75, wherein from about 16 wt % to about 20 wt % of the fatty acid moieties are saturated, from about 48 wt % to about 52 wt % of the fatty acid moieties are monounsaturated, and from about 29 wt % to about 33 wt % of the fatty acid moieties are polyunsaturated.

96. The method of any one of embodiments 1 to 75, wherein from about 15 wt % to about 21 wt % of the fatty acid moieties are saturated, from about 47 wt % to about 53 wt % of the fatty acid moieties are monounsaturated, and from about 28 wt % to about 34 wt % of the fatty acid moieties are polyunsaturated.

97. The method of any one of embodiments 1 to 75, wherein from about 14 wt % to about 22 wt % of the fatty acid moieties are saturated, from about 46 wt % to about 54 wt % of the fatty acid moieties are monounsaturated, and from about 27 wt % to about 35 wt % of the fatty acid moieties are polyunsaturated.

98. The method of any one of embodiments 1 to 75, wherein from about 13 wt % to about 23 wt % of the fatty acid moieties are saturated, from about 45 wt % to about 55 wt % of the fatty acid moieties are monounsaturated, and from about 26 wt % to about 36 wt % of the fatty acid moieties are polyunsaturated.

99. The method of any one of embodiments 1 to 75, wherein from about 14 wt % to about 19 wt % of the fatty acid moieties are saturated, from about 28 wt % to about 74 wt % of the fatty acid moieties are monounsaturated, and from about 10 wt % to about 58 wt % of the fatty acid moieties are polyunsaturated.

100. The method of any one of embodiments 1 to 75, wherein from about 9 wt % to about 19 wt % of the fatty acid moieties are saturated, from about 13 wt % to about 74 wt % of the fatty acid moieties are monounsaturated, and from about 10 wt % to about 78 wt % of the fatty acid moieties are polyunsaturated.

101. The method of any one of embodiments 1 to 100, wherein the lipid composition further comprises tocopherols, phytosterols, or any combination thereof.

102. The method of any one of embodiments 1 to 101, wherein at least 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, or at least about 99 wt % of the plurality of petroleum-derived materials are produced as one or more agglomerates.

103. The method of any one of embodiments 1 to 102, further comprising comminuting the petroleum-derived materials before contacting the petroleum-derived materials with the lipid composition, such as by shredding.

104. The method of any one of embodiments 1 to 103, wherein the method does not comprise sorting the petroleum-derived materials, cleaning the petroleum-derived materials, or both.

105. The method of any one of embodiments 1 to 104, further comprising washing the agglomerate, e.g., with water.

106. The method of embodiment 105, further comprising a step of drying the agglomerate after it has been washed.

107. The method of any one of embodiments 1 to 106, further comprising extruding the agglomerate.

108. The method of any one of embodiments 1 to 106, further comprising injecting the agglomerate into a mold.

109. The method of any one of embodiments 1 to 106, further comprising comminuting the agglomerate.

110. The method of any one of embodiments 1 to 109, further comprising curing the agglomerate.

111. The method of embodiment 110, wherein the curing is a heat treatment, a cryogenic treatment, a chemical treatment (such as with a peroxide), or any combination thereof.

112. The method of embodiment 111, wherein the heat treatment occurs at a temperature from about 40° C. to about 160° C.

113. The method of embodiment 111, wherein the cryogenic treatment occurs at a temperature from about −20° C. to about 4° C.

114. The method of embodiment 111, wherein the chemical treatment is with a peroxide, such as hydrogen peroxide.

115. The method of any one of embodiments 1 to 114, further comprising combining the agglomerate with a starch such as cornstarch, and comminuting the resulting combination to produce a powdered material.

116. The method of embodiment 115, wherein the ratio of the starch combined with the agglomerate is from about 1:99 to about 1:4 by weight, such as about 1:99, about 1:90, about 1:50, about 1:20, about 1:10, about 1:9, about 1:8, about 1:7, about 1:6, about 1:5, or about 1:4 by weight.

117. The method of any one of embodiments 1 to 114, further comprising combining the agglomerate with a filler to produce a composite.

118. The method of embodiment 117, wherein the filler is a particulate solid (such as sand, glass, or wood residues such as chips, shavings, or sawdust), a fibrous material (such as a textile fibre such as hemp, cotton, linen, or wool, or a paper such as non-recyclable paper), or any combination thereof.

119. The method of embodiment 117 or 118, wherein the ratio of the filler combined with the agglomerate is from about 1:99 to about 1:1 by weight, such as about 1:99, about 1:90, about 1:50, about 1:20, about 1:10, about 1:9, about 1:8, about 1:7, about 1:6, about 1:5, about 1:4, about 1:3, about 3:7, about 1:2, about 2:3, or about 1:1 by weight.

120. The method of any one of embodiments 117 to 119, further comprising combining a cement with the filler and the agglomerate.

121. The method of embodiment 120, wherein the cement and the agglomerate are combined prior to combining with the filler.

122. The method of embodiment 120, wherein the filler and the agglomerate are combined prior to combining with the cement.

123. The method of any one of embodiments 120 to 122, wherein the cement is a hydraulic cement.

124. The method of embodiment 123, wherein the amount of water used to cure the hydraulic cement is less than about 10 wt % or less than about 5 wt % of the total materials in the resulting composite.

125. The method of any one of embodiments 120 to 124, wherein the ratio of the agglomerate combined with the cement is from about 1:99 to about 4:1 by weight, such as about 1:99, about 1:90, about 1:50, about 1:20, about 1:10, about 1:9, about 1:8, about 1:7, about 1:6, about 1:5, about 1:4, about 1:3, about 3:7, about 1:2, about 2:3, about 1:1, about 3:2, about 2:1, about 7:3, about 3:1, or about 4:1 by weight.

126. The method of embodiment 115 or 116, further comprising combining the powdered material with a cement, such as a hydraulic cement; and a filler, such as a particulate solid (such as sand, glass, or wood residues such as chips, shavings, or sawdust) and/or a fibrous material (such as a textile fibre such as hemp, cotton, linen, or wool, or a paper such as non-recyclable paper); to produce a composite.

127. The method of embodiment 126, wherein the ratio of the cement to the powdered material is about 1:1 by weight, and the ratio of the filler to the powdered material about 5:1 by weight.

128. The method of any one of embodiments 117 to 127, further comprising shaping the composite into a construction unit, such as a block, a paving stone, a tile, a beam, a sheet, or a board.

129. The method of any one of embodiments 1 to 114, further comprising combining the agglomerate and a bitumen to produce a paving material.

130. The method of embodiment 129, wherein the ratio of the bitumen combined with the agglomerate is from about 1:99 to about 99:1 by weight, such as about 1:99, about 1:90, about 1:50, about 1:20, about 1:10, about 1:9, about 1:8, about 1:7, about 1:6, about 1:5, about 1:4, about 1:3, about 3:7, about 1:2, about 2:3, about 1:1, about 3:2, about 2:1, about 7:3, about 3:1, about 4:1, about 5:1, about 6:1, about 7:1, about 8:1, about 9:1, about 10:1, about 20:1, about 50:1, about 90:1, or about 99:1 by weight. 131. The method of embodiment 129, wherein the ratio of the bitumen combined with the agglomerate is from about 3:7 to about 2:3 by weight.

132. A system, comprising a vessel configured for contacting a plurality of petroleum-derived materials with a lipid composition comprising fatty acid moieties to produce an agglomerate, wherein from about 9 wt % to about 40 wt % of the fatty acid moieties are saturated, and wherein at least about 0.5 wt % of the fatty acid moieties are monounsaturated; and a first outlet configured for discharging at least a portion of the agglomerate from the vessel.

133. The system of embodiment 132, wherein the system is for recycling petroleum-derived materials.

134. The system of embodiment 132 or 133, wherein the first outlet is configured for extruding at least a portion of the agglomerate from the vessel, such as with an auger.

135. The system of any one of embodiments 132 to 134, further comprising a first inlet configured for receiving the petroleum-derived materials in the vessel.

136. The system of any one of embodiments 132 to 135, further comprising at least one second inlet configured for receiving the lipid composition in the vessel.

137. The system of embodiment 136, wherein the at least one second inlet is a spray nozzle.

138. The system of any one of embodiments 132 to 137, wherein the system is configured for receiving a filler into the vessel to produce a composite.

139. The system of embodiment 138, wherein the system further comprises at least one third inlet configured for receiving the filler into the vessel.

140. The system of any one of embodiments 132 to 139, further comprising a comminuting module for comminuting the petroleum-derived materials, e.g., by shredding, before the petroleum-derived materials enter the vessel.

141. The system of any one of embodiments 132 to 140, further comprising a feeder module for feeding the petroleum-derived materials into the vessel.

142. The system of any one of embodiments 132 to 141, further comprising a premixing module for mixing the petroleum-derived materials before they enter the vessel.

143. The system of any one of embodiments 132 to 142, wherein the vessel is configured for mixing the lipid composition with the petroleum-derived materials.

144. The system of embodiment 143, wherein the vessel is a batch mixer, such as a drum mixer, pan mixer, blade mixer (e.g., a double-arm Z-blade mixer, such as that manufactured by SIGMA Equipment), paddle mixer, ribbon mixer, diving-arm mixer, screw mixer, twin-screw mixer, V mixer, or double cone mixer.

145. The system of any one of embodiments 132 to 141, wherein the vessel is configured (e.g., in the form of a cyclone) for spraying (e.g., through at least one spray nozzle) the lipid composition on the petroleum-derived materials.

146. The system of any one of embodiments 132 to 141, wherein the vessel is configured (e.g., in the form of a slide) for soaking the petroleum-derived materials in the lipid composition.

147. The system of any one of embodiments 132 to 146, wherein the vessel is heated.

148. The system of any one of embodiments 132 to 147, wherein the system is configured for separating the agglomerate from the lipid composition.

149. The system of any one of embodiments 132 to 148, wherein the system further comprises a second outlet configured for discharging at least a portion of the lipid composition from the vessel.

150. The system of any one of embodiments 132 to 149, wherein the system is configured for recycling at least a portion of the lipid composition.

151. The system of any one of embodiments 132 to 150, further comprising a washing module for washing the agglomerate, e.g., with water.

152. The system of any one of embodiments 132 to 151, further comprising a drying module for drying the agglomerate after it has been washed.

153. The system of any one of embodiments 132 to 152, further comprising a conveyor, such as a belt or an auger, configured for conveying the agglomerate discharged from the first outlet to a remote location.

154. An agglomerate produced by the method of any one of embodiments 1 to 114.

155. The agglomerate of embodiment 154, wherein the agglomerate is in chip or powder form.

156. The agglomerate of embodiment 154 or 155, wherein the agglomerate comprises from more than 0 wt % to about 20 wt % of the lipid composition, such as from about 0.1 wt % to about 20 wt %, from about 1 wt % to about 20 wt %, from about 1 wt % to about 15 wt %, from about 1 wt % to about 10 wt %, from about 1 wt % to about 9 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, from about 3 wt % to about 5 wt %, from about 4 wt % to about 5 wt %, from about 1 wt % to about 4 wt %, from about 2 wt % to about 4 wt %, from about 3 wt % to about 4 wt %, from about 1 wt % to about 3 wt %, from about 2 wt % to about 3 wt %, or from about 1 wt % to about 2 wt % of the lipid composition.

157. The agglomerate of embodiment 154 or 155, wherein the agglomerate comprises about 0.1 wt %, about 1 wt %, about 2 wt %, about 3 wt %, about 4 wt %, about 5 wt %, about 6 wt %, about 7 wt %, about 8 wt %, about 9 wt %, about 10 wt %, about 15 wt %, or about 20 wt % of the lipid composition.

158. The agglomerate of embodiment 154 or 155, wherein the agglomerate comprises at least about 0.1 wt %, at least about 1 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, 11 wt %, at least about 12 wt %, at least about 13 wt %, at least about 14 wt %, at least about 15 wt %, at least about 16 wt %, at least about 17 wt %, at least about 18 wt %, at least about 19 wt %, or at least about 20 wt % of the lipid composition.

159. The agglomerate of any one of embodiments 154 to 158, wherein the agglomerate has a lower viscosity compared to petroleum-derived materials at the temperature at which the agglomerate is produced.

160. The agglomerate of any one of embodiments 154 to 159, wherein the agglomerate is less stiff compared to petroleum-derived materials at the temperature at which the agglomerate is produced.

161. The agglomerate of any one of embodiments 154 to 160, wherein the agglomerate is more capable of adhering to other materials compared to petroleum-derived materials at the temperature at which the agglomerate is produced.

162. The agglomerate of any one of embodiments 154 to 161, wherein the agglomerate is less thermally conductive compared to petroleum-derived materials at the temperature at which the agglomerate is produced.

163. The agglomerate of any one of embodiments 154 to 162, wherein the agglomerate has a higher surface area than the petroleum-derived materials from which the agglomerate is produced.

164. The agglomerate of any one of embodiments 154 to 163, wherein the agglomerate has a lower surface area than the petroleum-derived materials from which the agglomerate is produced.

165. The agglomerate of any one of embodiments 154 to 164, wherein the agglomerate has a higher material strength than the petroleum-derived materials from which the agglomerate is produced.

166. The agglomerate of any one of embodiments 154 to 165, wherein the agglomerate has a lower material strength than the petroleum-derived materials from which the agglomerate is produced.

167. The agglomerate of any one of embodiments 154 to 166, wherein the agglomerate has a higher stiffness than the petroleum-derived materials from which the agglomerate is produced.

168. The agglomerate of any one of embodiments 154 to 167, wherein the agglomerate has a lower stiffness than the petroleum-derived materials from which the agglomerate is produced.

169. The agglomerate of any one of embodiments 154 to 168, wherein the agglomerate has a higher hardness than the petroleum-derived materials from which the agglomerate is produced.

170. The agglomerate of any one of embodiments 154 to 169, wherein the agglomerate has a lower hardness than the petroleum-derived materials from which the agglomerate is produced.

171. The agglomerate of any one of embodiments 154 to 170, wherein the agglomerate has a higher thermal conductivity than the petroleum-derived materials from which the agglomerate is produced.

172. The agglomerate of any one of embodiments 154 to 171, wherein the agglomerate has a lower thermal conductivity than the petroleum-derived materials from which the agglomerate is produced.

173. The agglomerate of any one of embodiments 154 to 172, wherein the agglomerate has a higher density than the petroleum-derived materials from which the agglomerate is produced.

174. The agglomerate of any one of embodiments 154 to 173, wherein the agglomerate has a lower density than the petroleum-derived materials from which the agglomerate is produced.

175. A powdered material produced by the method of embodiment 115 or 116.

176. A composite produced by the method of any one of embodiments 117 to 127.

177. A construction unit such as a block, a paving stone, a tile, a beam, a sheet, or a board produced by the method of embodiment 128.

178. A paving material produced by the method of any one of embodiments 129 to 131.

179. An apparatus for producing an extrudate from petroleum-derived materials, comprising:
  (a) a pre-extrusion mixer for contacting a plurality of petroleum-derived materials with a lipid composition comprising fatty acid moieties and a filler to produce a composite, having one or more inlets for receiving the petroleum-derived materials, the lipid composition, and the filler, and an outlet for discharging the composite; and
  (b) an extruder in fluid communication with the outlet of the pre-extrusion mixer for receiving the composite therefrom.

180. The apparatus of embodiment 179, wherein the extruder comprises a barrel and a rotatable power screw extending continuously therein between an inlet end and a discharge end of the barrel, the barrel having an inlet port at the inlet end, the inlet port being in fluid communication with the outlet of the pre-extrusion mixer for receiving the composite therefrom.

181. The apparatus of embodiment 179 or 180, wherein the power screw has substantially continuous thread means of generally helical configuration.

182. The apparatus of any one of embodiments 179 to 181, further comprising a preforming device directly positioned at the discharge end of the extruder for forming the extrudate into a billet with a predetermined cross section, the preforming device comprising a discharge end through which a measured volume of the billet is discharged.

183. The apparatus of embodiment 182, further comprising a cutting device positioned for movement across the discharge end of the preforming device to cut the elongated billet to a predetermined length.

184. The apparatus of any one of embodiments 179 to 183, wherein the pre-extrusion mixer is a double-arm Z-blade mixer.

185. The apparatus of any one of embodiments 179 to 184, wherein the pre-extrusion mixer is heated.

186. The apparatus of any one of embodiments 179 to 185, further comprising a secondary mixer for contacting a plurality of petroleum-derived materials with a lipid composition comprising fatty acid moieties and a filler to produce an agglomerate, the secondary mixer having one or more inlets for receiving the petroleum-derived materials and the lipid composition, and an outlet in fluid communication with an inlet of the pre-extrusion mixer for discharging the agglomerate into the pre-extrusion mixer.

187. The apparatus of embodiment 186, wherein the secondary mixer is a double-arm Z-blade mixer.

188. The apparatus of embodiment 187, wherein the secondary mixer is heated.

189. The apparatus of any one of embodiments 179 to 188, further comprising a pre-mixer for contacting a plurality of petroleum-derived materials that are not plastic packaging with a lipid composition, the pre-mixer having one or more inlets for receiving the petroleum-derived materials and the lipid composition, and an outlet in fluid communication with an inlet of the secondary mixer for discharging the pre-mixed composition into the secondary mixer, wherein another inlet of the secondary mixer is configured for receiving a composition comprising plastic packaging.

190. The apparatus of embodiment 189, wherein the pre-mixer is a blade mixer.

191. The apparatus of embodiment 189 or 190, wherein the pre-mixer is heated.

EXAMPLES

Example 1: Processing of Waste Plastics in Various Oils at 66° C. and 93° C.

Figure 1B:
Figure 1C:
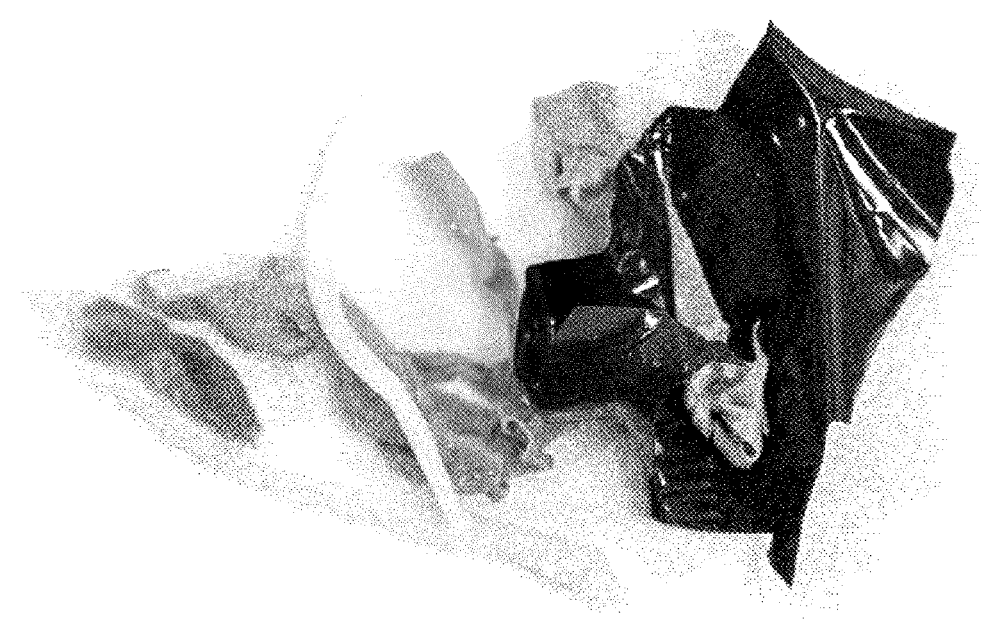
Figure 2A:
FIGS. 2A-2C: Agglomerates produced by mixing shredded plastic film and thin molded plastics in the following vegetable oils at 93° C.: corn oil (FIG. 2A), olive oil (FIG. 2B), and canola oil (FIG. 2C).
Figure 2B:
Figure 2C:
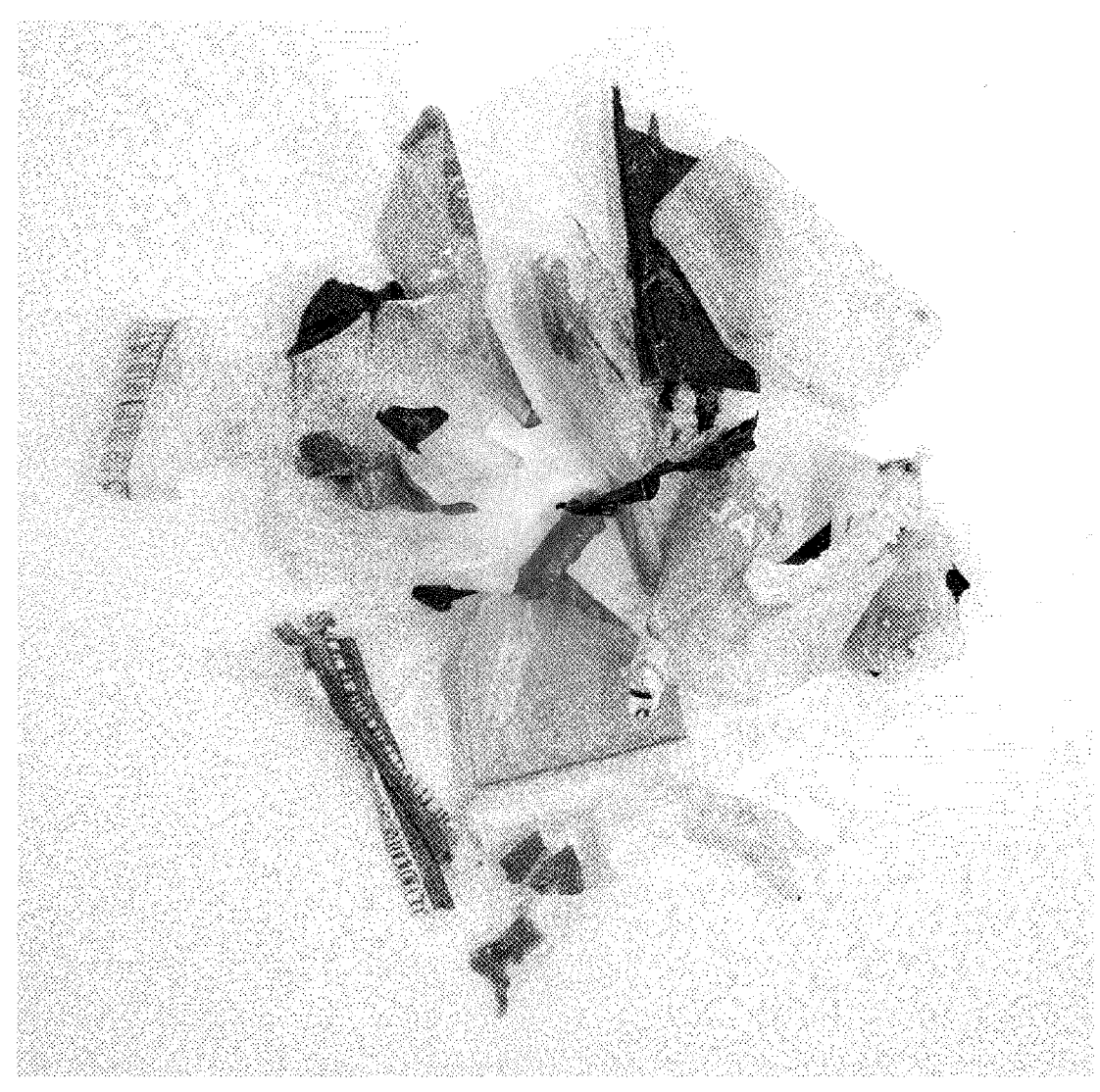

Half a cup (120 mL) of a plant oil was heated to 66° C. or 93° C. A mix of shredded pieces of plastic film (LDPE, PP), thin molded plastics (PP and PET coffee cup lids, and PET trays), and polystyrene foam was added to the oil. After 15 min, the plastics were stirred to determine whether pieces would adhere to each other to form agglomerates. The plastics were then removed from the oil and allowed to cool to room temperature. The results are recorded in Table 1. Results using corn, olive, and canola oil at 66° C. and 93° C. are depicted in FIGS. 1 and 2 respectively. Efficacy scale: 2=all plastics tested formed agglomerates; 1=some plastics tested formed agglomerates; 0=no plastics tested formed agglomerates. Data on the fatty acid compositions of each vegetable oil is taken from Dubois, V. et al, "Fatty acid profiles of 80 vegetable oils with regard to their nutritional potential", *Eur. J. Lipid Sci. Technol.* 109 (2007), 710-732. SFA=saturated fatty acids; MUFA=monounsaturated fatty acids; PUFA=polyunsaturated fatty acids.

TABLE 1

| Oil | Efficacy at 66° C. | Efficacy at 93° C. | % SFA | % MUFA | % PUFA |
|---|---|---|---|---|---|
| Corn | 2 | 2 | 14.8 | 28.1 | 57.1 |
| Olive | 2 | 2 | 15.3 | 73.8 | 10.0 |
| Peanut | 1 | 2 | 18.3 | 49.6 | 30.8 |
| Flax | 1 | 0 | 10.0 | 18.5 | 71.8 |
| Safflower | 1 | 0 | 9.1 | 13.9 | 77.3 |
| Sesame | 1 | 0 | 15.7 | 40.1 | 45.7 |
| Sunflower | 1 | 0 | 12.8 | 22.4 | 66.0 |
| Canola | 0 | 0 | 8.0 | 62.4 | 31.5 |
| Coconut | 0 | 0 | 92.6 | 6.1 | 1.9 |
| Walnut | 0 | 0 | 14.8 | 0.4 | 84.0 |

Example 2: Production of a Block from Waste Plastics

Figure 3:
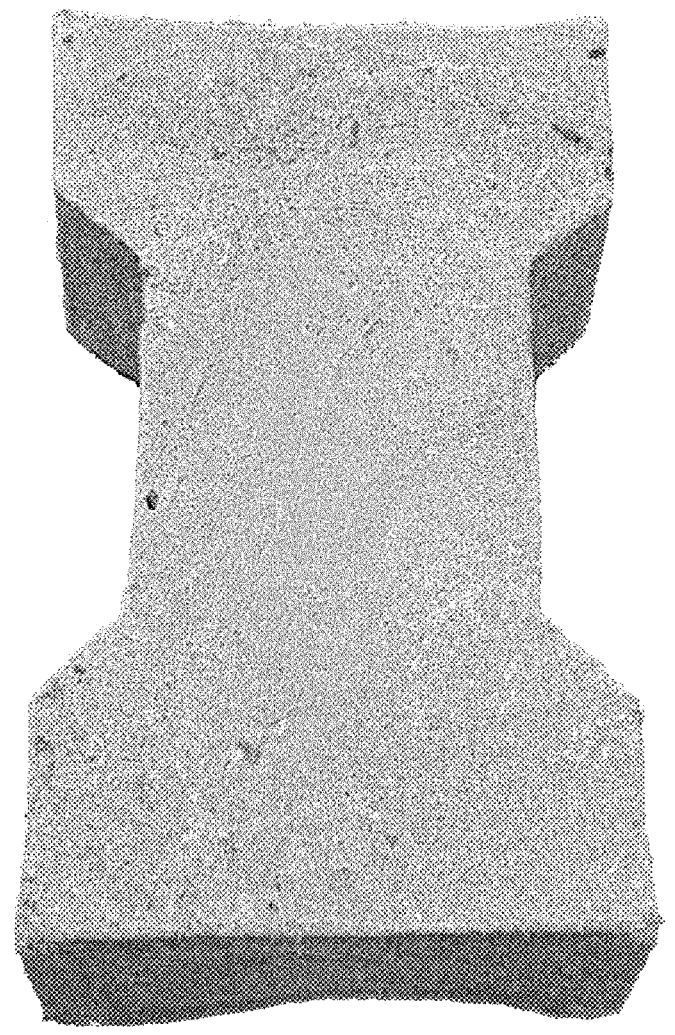
FIG. 3: Block produced by combining sand with agglomerates produced by mixing shredded plastic film and thin molded plastics in corn oil.

Two oz. (60 mL) of corn oil was heated to 93° C. Three pounds (1.4 kg) of a mix of shredded plastics (consisting of approximately 60 wt % plastic film, 15 wt % polystyrene foam, and the remainder being PVC, ABS, and HDPE) were added to the oil until all the oil was incorporated into the plastics to form an agglomerate. Then one pound (450 g) of hot sand was slowly mixed into the agglomerate. The resulting slurry was then poured into a mold and allowed to set, forming a block (FIG. 3). The block shrank and self-released from the mold as it set.

Figure 4A:
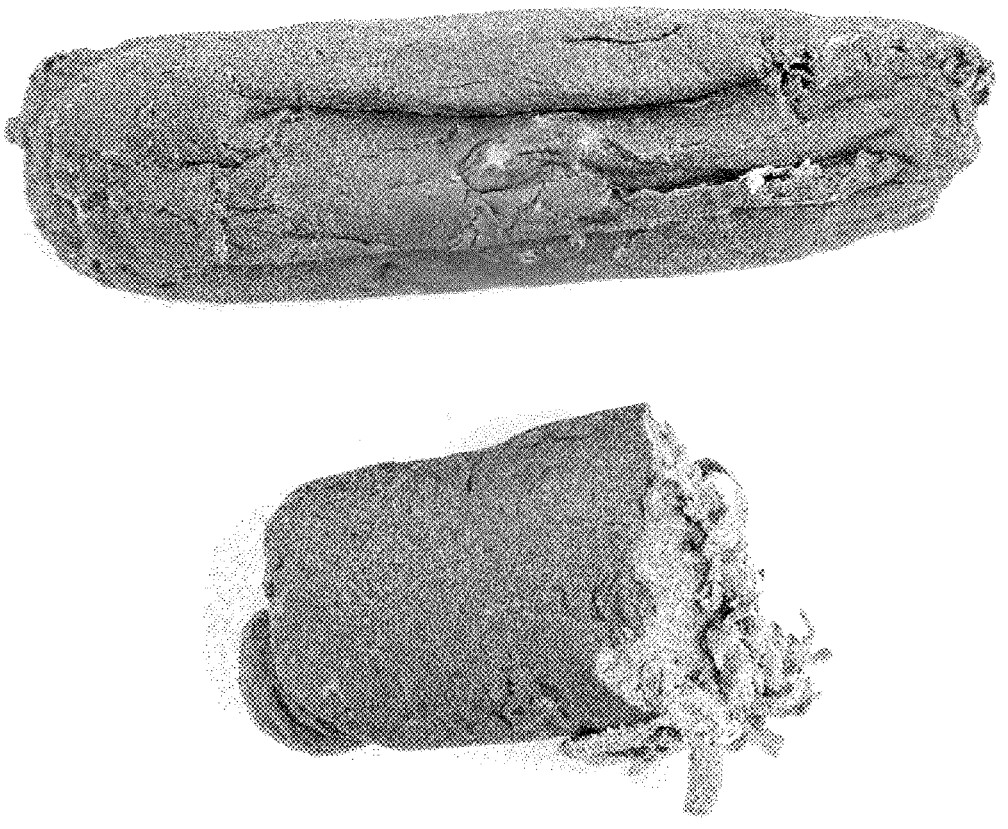
FIG. 4A: Product of mixing cornstarch with agglomerates produced by mixing shredded plastic film and thin molded plastics in corn oil.

Example 3: Production of a Powdered Material from Waste Plastics, and a Composite from the Powdered Material Corn oil was heated to 140° C. A mix of petroleum-derived materials (consisting of approximately 60 wt % shredded plastic film, 15 wt % shredded polystyrene foam, and the remainder being shredded PVC, ABS, and HDPE) was added to the oil until all the oil was incorporated into the petroleum-derived materials to form an agglomerate. While still at 140° C., the agglomerate was mixed with cornstarch in a 5.5:1 ratio by weight. The resulting mixture was cooled to room temperature to form the solid depicted in FIG. 4A. The solid was coarsely shredded (FIG. 4B), mixed with an equal weight of cornstarch, and ground into a powdered material. Portland cement was added to the powdered material in a 1:1 ratio by weight (FIG. 4C). Several drops of water were added to cure the mixture, which formed the solid piece of a lightweight composite (FIG. 4D). To form the composite depicted in FIG. 4E, the foregoing procedure was repeated, except sand was added to the mixture of cement and powdered material in a ratio of 5:1 by weight before water was added to cure the mixture.

Example 4: Production of a Paving Material from Waste Plastics

Corn oil was heated to 140° C. A mix of shredded plastics (consisting of approximately 60 wt % plastic film, 15 wt % polystyrene foam, 5 wt % recycled asphalt shingles, and the remainder being PVC, ABS, and HDPE) was added to the oil until all the oil was incorporated into the plastics to form an agglomerate. Separately, pieces of recycled asphalt pavement were mixed with the same vegetable oil at 93° C. to form a slurry. The asphalt slurry was slowly added to the agglomerate. Additional shredded plastic film was then added to this mixture. While still hot, the resulting mixture was then applied to a cracked pavement, to which it readily adhered without application of pressure, as is typically required for cold-patch asphalt repair. Better sealing was observed using this mixture than with standard hot-mix asphalt.

Example 5: System for Spraying Lipid Compositions on Shredded Plastic Film

Figure 5:
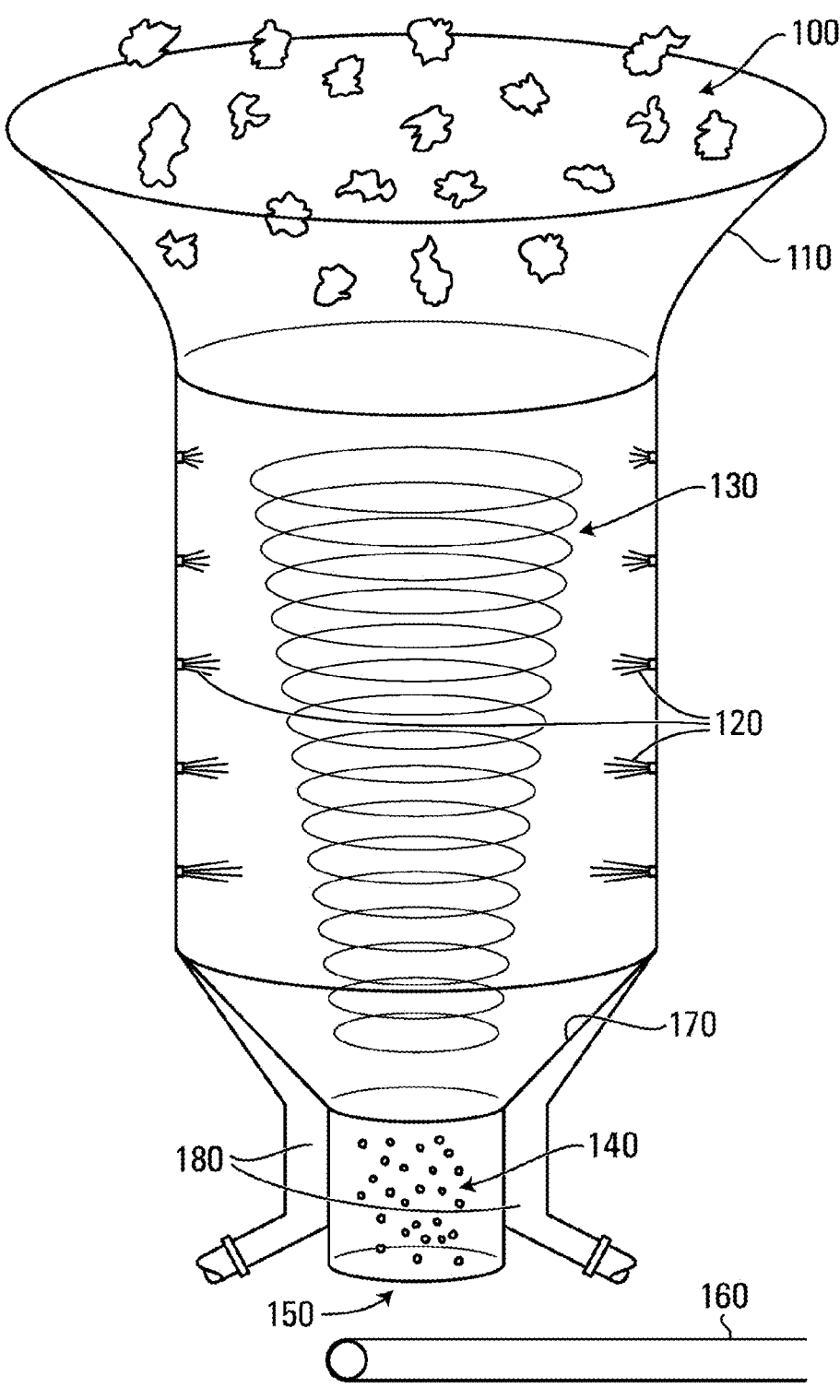
FIG. 5: Diagram of vessel for spraying flakes of plastic film with heated oil and recycling excess oil.

FIG. 5 shows a cyclone for spraying flakes of plastic film with oil and recycling excess oil. Shredded flakes of plastic film (100) are fed into the top of the cyclone through a chute (110). Within the cyclone, spray nozzles (120) are positioned and angled to deliver heated oil in such a way as to generate a vortex (130). The plastic flakes shrivel upon contact with the vortex of oil, forming agglomerates (140). Agglomerates fall through the central outlet at the bottom of the cyclone (150) on to a conveyor belt (160). Screens (170) are positioned around the central outlet to capture oil for recycling (180) while excluding agglomerates.

Example 6: System for Soaking Plastic Film in Lipid Compositions

Figure 6A:
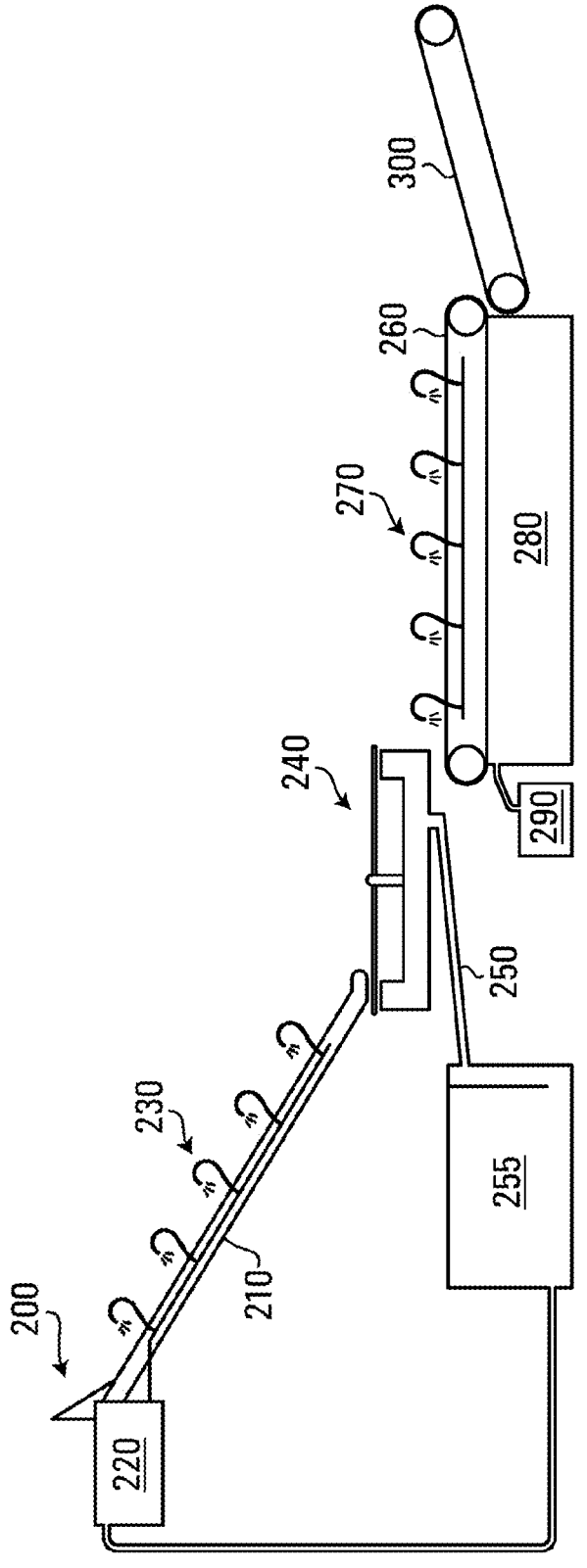
FIG. 6A: Diagram of system for soaking flakes of thin plastics with heated oil and recycling excess oil.
Figure 6B:
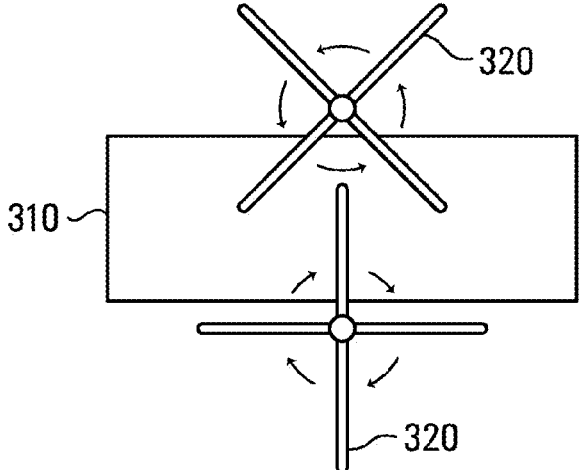
FIG. 6B: Top view of screen tray 240 of FIG. 6A.

FIG. 6A shows a system for soaking thin flakes of plastic with heated oil and recycling excess oil. Shredded pieces of plastics drop from a deflector chute (200) on to a slide (210), where they are contacted with a heated oil introduced from a first reservoir (220) through spray nozzles (230) to form agglomerates. The flow of oil from the first reservoir may be controlled by a flow gate. At the end of the slide, agglomerates drop on to a screen tray (240; see FIG. 6B for top view of 240), where the oil which falls through the screen (FIG. 6B, 310) on to a drain slide (FIG. 6A, 250) is recovered in a second oil reservoir (255). This second reservoir may be in fluid communication with the first reservoir (220) to allow for recycling of the oil. The agglomerates which remain on the tray are transferred using circular sweepers (FIG. 6B, 320) on to a conveyor belt (FIG. 6A, 260), where they are sprayed with hot water supplied through spray nozzles (270) connected to a water reservoir (280). Used water may be collected for recovery (290). The washed agglomerates are transferred to a second conveyor belt (300), where they are air-dried.

Example 7: Mixers for Petroleum-Derived Materials with Lipid Compositions

Figure 7:
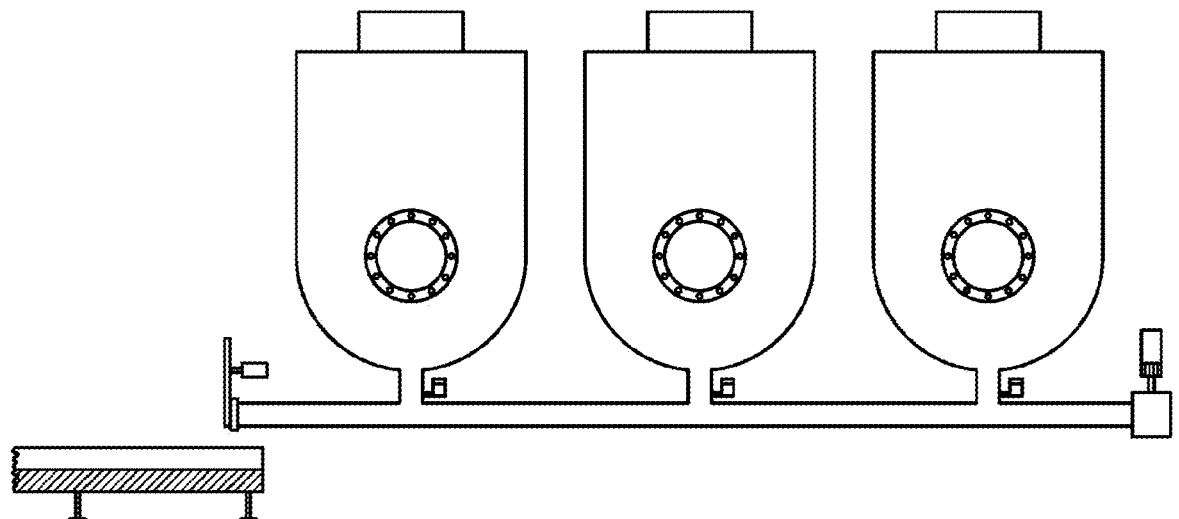
FIG. 7: Diagram of system of connected mixers for parallel processing of petroleum-derived materials with lipid compositions.

Mixers such as rotating drum mixers or diving-arm mixers can be used for batch or semi-batch processing of a variety of petroleum-derived materials, including both plastic packaging and hard/rigid plastics, with lipid compositions at temperatures from about 40° C. to about 160° C., or preferably from about 90° C. to about 140° C. The mixers may be double-jacketed for temperature control purposes. The mixing schedules of multiple batch mixers may be staggered over time and their outputs connected by a conveyor system (FIG. 7), such as an auger, to achieve quasi-continuous generation of product. Table 2 provides possible hourly schedules for achieving this with three, four, or six batch mixers:

TABLE 2

| Number of mixers | Fill time (min) | Mix time (min) | Dump time (min) |
|---|---|---|---|
| 3 | 20 | 20 | 20 |
| 4 | 15 | 30 | 15 |
| 6 | 10 | 40 | 10 |

Example 8: Apparatus for Producing Construction Units

Figure 8:
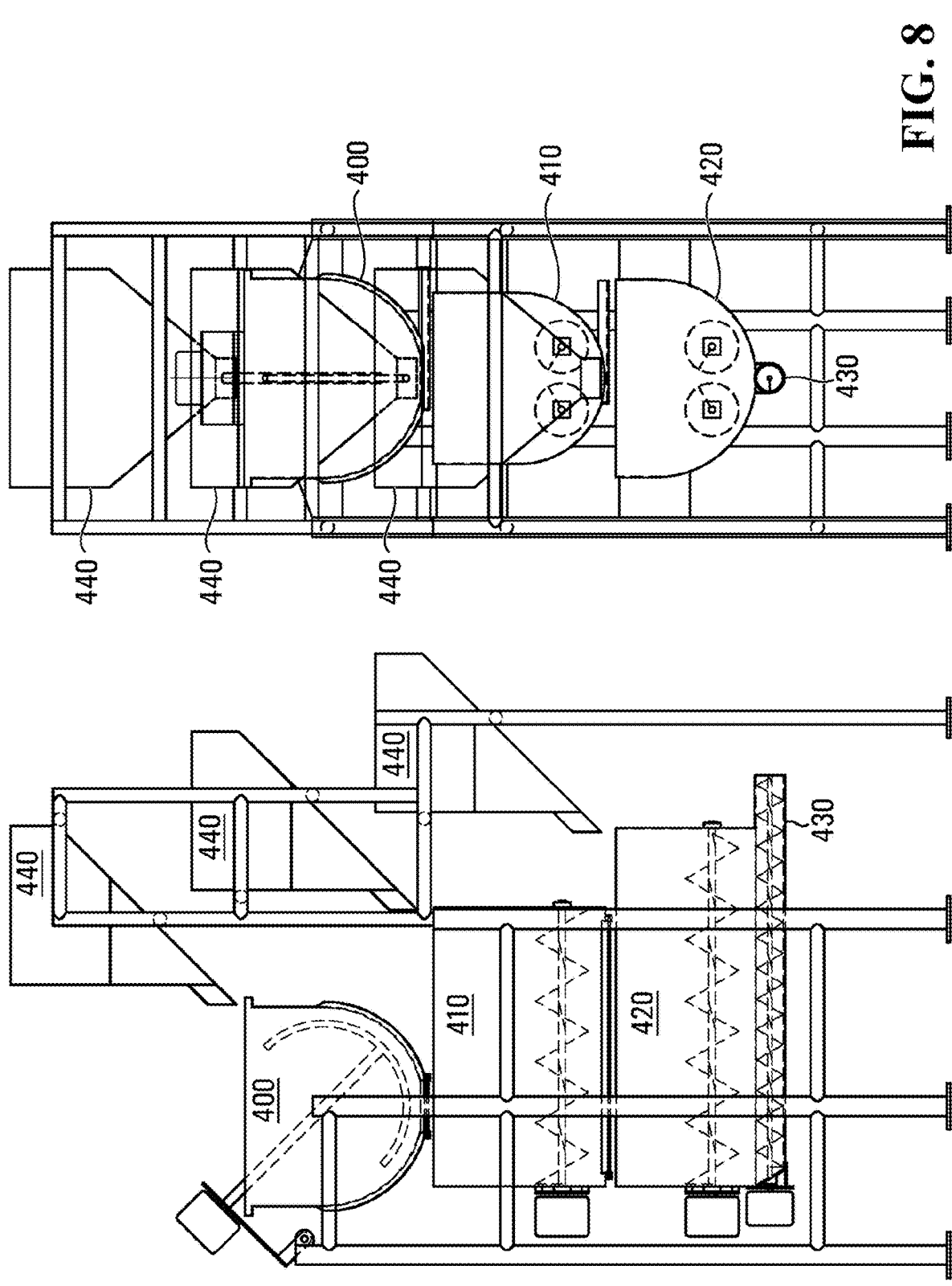
FIG. 8: Diagram of apparatus for producing an extrudate from petroleum-derived materials, comprising multiple mixers connected in series for contacting a plurality of petroleum-derived materials with a lipid composition and a filler to produce a composite, and an extruder connected to the outlet of the pre-extrusion mixer for receiving and extruding the composite.
Figure 9:
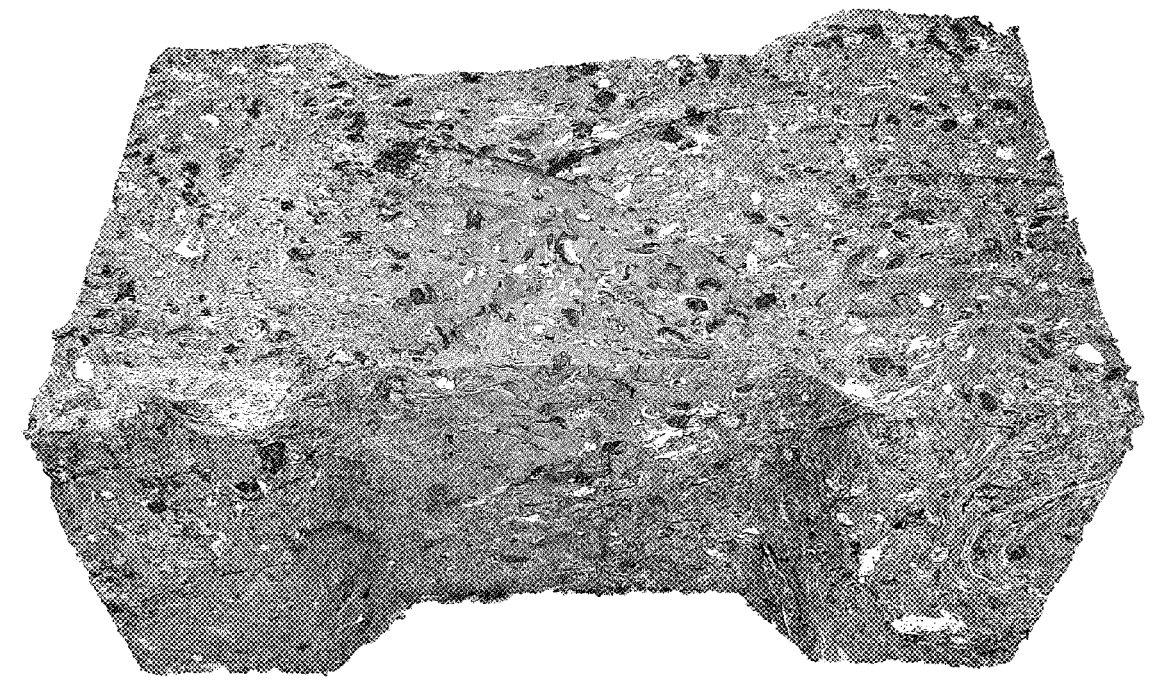
FIG. 9: Block produced by combining sand with agglomerates produced by mixing ground automobile parts, shredded plenum cable jackets, shredded plastic film, and thin molded plastics in corn oil.

FIG. 8 shows a front and side view of an apparatus for forming agglomerates from petroleum-derived materials, oil, and a filler and optionally producing construction units therefrom. Petroleum-derived materials are introduced into a mixer (400) with narrow, curved blades and combined with oil therein. Suitable petroleum-derived materials at this stage include shredded automotive component scrap, which may be derived from thermosetting polymers. The resulting composition is discharged into double-arm Z-blade mixer (410), to which additional petroleum-derived materials such as plastic packaging may be added. The resulting composition is discharged into a second double-arm Z-blade mixer (420), to which a filler such as sand may be added. The resulting composition is discharged into extruder (430) having a power screw. A preforming device may be positioned at the discharge end of the extruder for shaping the extrudate into a predetermined cross section. A cutting device may be used to cut a billet extruded through the preforming device to a predetermined length. Once cured, the billet may be further cut into construction units having the predetermined cross section.

Although the system as depicted contains three mixers connected in series, more or fewer mixers may be connected as appropriate. Materials to be introduced into the mixers may be dispensed from hoppers (440). The temperature of the mixers may be independently controlled.

Although the foregoing invention has been described in some detail by way of illustration and example for purposes of clarity of understanding, it is readily apparent to those of ordinary skill in the art in light of the teachings of this invention that certain changes and modifications may be made thereto without departing from the scope of the appended claims.

The compounds described herein may contain one or more chiral centers and/or double bonds and therefore, may exist as stereoisomers, such as double-bond isomers (i.e., geometric isomers such as E and Z), enantiomers or diastereomers. The present disclosure includes each of the isolated stereoisomeric forms (such as the enantiomerically pure isomers, the E and Z isomers, and other alternatives for stereoisomers) as well as mixtures of stereoisomers in varying degrees of chiral purity or percentage of E and Z, including racemic mixtures, mixtures of diastereomers, and mixtures of E and Z isomers.

Accordingly, the compounds described herein encompass all possible enantiomers and stereoisomers thereof including the stereoisomerically pure form (e.g., geometrically pure, enantiomerically pure or diastereomerically pure) and enantiomeric and stereoisomeric mixtures.

Enantiomeric and stereoisomeric mixtures can be resolved into their component enantiomers or stereoisomers using separation techniques or chiral synthesis techniques well known to the skilled artisan. The present disclosure includes each of the isolated stereoisomeric forms as well as mixtures of stereoisomers in varying degrees of chiral purity, including racemic mixtures. It also encompasses the various diastereomers.

When the chemical name does not specify the isomeric form of the compound, it denotes any one of the possible isomeric forms or mixtures of those isomeric forms of the compound. The compounds may also exist in several tautomeric forms. Accordingly, the compounds depicted herein encompass all possible tautomeric forms thereof.

It must be noted that as used in this specification and the appended claims, the singular forms "a," "an," and "the" include plural reference unless the context clearly dictates otherwise. Unless defined otherwise all technical and scientific terms used herein have the same meaning as commonly understood to one of ordinary skill in the art to which this invention belongs.

The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined.

Other elements may optionally be present other than the elements specifically identified by the "and/or" clause, whether related or unrelated to those elements specifically identified.

Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to encompass the same meaning as "and/or" as defined above.

For example, when separating items in a list, "or" or "and/or" shall be interpreted as being inclusive, i.e., the inclusion of at least one, but also including more than one, of a number or list of elements, and, optionally, additional unlisted items.

As used herein, whether in the specification or the appended claims, the transitional terms "comprising", "including", "having", "containing", "involving", and the like are to be understood as being inclusive or open-ended (i.e., to mean including but not limited to), and they do not exclude unrecited elements, materials or method steps. Only the transitional phrases "consisting of" and "consisting essentially of", respectively, are closed or semi-closed transitional phrases with respect to claims and exemplary embodiment paragraphs herein. The transitional phrase "consisting of" excludes any element, step, or ingredient which is not specifically recited.

The transitional phrase "consisting essentially of" limits the scope to the specified elements, materials or steps and to those that do not materially affect the basic characteristic(s) of the invention disclosed and/or claimed herein.

The invention claimed is:

1. A method, comprising contacting a plurality of petroleum-derived materials with a lipid composition comprising fatty acid moieties to produce an agglomerate, wherein from about 9 wt % to about 40 wt % of the fatty acid moieties are saturated, and wherein at least about 0.5 wt % of the fatty acid moieties are monounsaturated.

2. The method of claim 1, wherein the plurality of petroleum-derived materials comprise plastic or a mixture of plastic.

3. The method of claim 2, wherein the plurality of petroleum-derived materials comprise plastic packaging.

4. The method of claim 2, wherein the plurality of petroleum-derived materials comprise plastic in the form of a woven or nonwoven fabric.

5. A method, comprising:
(a) contacting a plurality of petroleum-derived materials that comprise plastic in the form of a seal, wire or cable jacket, floor covering, filter, vehicle part, or any combination thereof with a lipid composition comprising fatty acid moieties, wherein from about 9 wt % to about 40 wt % of the fatty acid moieties are saturated, and wherein at least about 0.5 wt % of the fatty acid moieties are monounsaturated, wherein at least 5 wt % of the petroleum-derived materials are not melted; and
(b) combining the mixture resulting from step (a) with a composition comprising plastic packaging to produce an agglomerate.

6. The method of claim 5, wherein the plurality of petroleum-derived materials comprise plastic in the form of a vehicle part.

7. The method of claim 1, wherein the method is for recycling the plurality of petroleum-derived materials.

8. The method of claim 2, wherein the plastic comprises polyethylene, polypropylene, polystyrene, polyethylene terephthalate, or any combination thereof.

9. The method of claim 1, wherein the lipid composition is provided at a temperature from about 55° C. to about 160° C., from about 65° C. to about 160° C., from about 90° C. to about 160° C., from about 120° C. to about 160° C., from about 125° C. to about 155° C., from about 130° C. to about 150° C., from about 135° C. to about 150° C., from about 135° C. to about 145° C., or from about 140° C. to about 150° C.

10. The method of claim 1, wherein the fatty acid moieties comprise free fatty acids, fatty acid esters, fatty alcohols, or any combination thereof.

11. The method of claim 10, wherein the lipid composition comprises an edible oil.

12. The method of claim 11, wherein the edible oil is corn oil, olive oil, peanut oil, or any combination thereof.

13. The method of claim 12, wherein the edible oil is corn oil.

14. The method of claim 1, wherein from about 10 wt % to about 20 wt % of the fatty acid moieties are saturated, from about 23 wt % to about 33 wt % of the fatty acid moieties are monounsaturated, and from about 52 wt % to about 62 wt % of the fatty acid moieties are polyunsaturated.

15. The method of claim 1, wherein the method does not comprise sorting the petroleum-derived materials, cleaning the petroleum-derived materials, or both.

16. The method of claim 1, further comprising combining the agglomerate with a starch, and comminuting the resulting combination to produce a powdered material.

17. The method of claim 1, further comprising combining the agglomerate with a filler and optionally a cement to produce a composite.

18. The method of claim 16, further comprising combining the powdered material with a cement, a filler, and/or a fibrous material to produce a composite.

19. The method of claim 1, further comprising combining the agglomerate and a bitumen to produce a paving material.

20. The method of claim 1, wherein at least 5 wt % of the petroleum-derived materials are not melted.

21. The method of claim 1, wherein the agglomerate has a lower surface area than the petroleum-derived materials from which the agglomerate is produced.

* * * * *